(12) United States Patent
Shin et al.

(10) Patent No.: US 11,490,378 B2
(45) Date of Patent: Nov. 1, 2022

(54) METHOD FOR TRANSMITTING/RECEIVING NARROWBAND PDCCH IN NARROWBAND-SUPPORTING WIRELESS COMMUNICATION SYSTEM, AND DEVICE THEREFOR

(71) Applicant: LG ELECTRONICS INC., Seoul (KR)

(72) Inventors: Seokmin Shin, Seoul (KR); Changhwan Park, Seoul (KR); Joonkui Ahn, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 16/965,593

(22) PCT Filed: Feb. 11, 2019

(86) PCT No.: PCT/KR2019/001642
§ 371 (c)(1),
(2) Date: Jul. 28, 2020

(87) PCT Pub. No.: WO2019/156521
PCT Pub. Date: Aug. 15, 2019

(65) Prior Publication Data
US 2021/0045099 A1    Feb. 11, 2021

Related U.S. Application Data

(60) Provisional application No. 62/668,769, filed on May 8, 2018, provisional application No. 62/629,110, filed on Feb. 11, 2018.

(30) Foreign Application Priority Data

May 10, 2018    (KR) .................. 10-2018-0053974

(51) Int. Cl.
*H04W 72/04* (2009.01)
*H04L 1/18* (2006.01)
(Continued)

(52) U.S. Cl.
CPC ............ *H04W 72/042* (2013.01); *H04L 1/18* (2013.01); *H04L 5/0053* (2013.01); *H04L 5/1469* (2013.01); *H04W 72/0446* (2013.01)

(58) Field of Classification Search
CPC ...... H04W 72/042; H04L 1/18; H04L 5/0053; H04L 1/08; H04L 5/1469
See application file for complete search history.

(56) References Cited

U.S. PATENT DOCUMENTS

2018/0020335 A1*  1/2018  Yin ................. H04L 1/1854
2018/0048985 A1*  2/2018  Park ................ H04W 4/06
(Continued)

FOREIGN PATENT DOCUMENTS

| WO | 2017160335 |   | 9/2017 |   |
|---|---|---|---|---|
| WO | WO-2017160335 | * | 9/2017 | ............... H04L 1/00 |
| WO | WO 2017160335 | * | 9/2017 | ............... H04L 1/00 |

OTHER PUBLICATIONS

3GPP TSG-RAN WG1 Meeting #91 R1-1721114, Reno Nevada, USA Nov. 27-Dec. 7 (Year: 2017).*
(Continued)

*Primary Examiner* — Diane L Lo
*Assistant Examiner* — Abusayeed M Haque
(74) *Attorney, Agent, or Firm* — Lee Hong Degerman Kang & Waimey

(57) ABSTRACT

The present specification discloses a method for a terminal receiving a narrowband PDCCH in a narrowband-supporting wireless communication system, and a device therefor. Specifically, the method comprises the steps of: receiving search space-related information from a base station via
(Continued)

upper layer signaling; and receiving, from the base station, a narrowband PDCCH from the search space, which comprises one or more narrowband PDCCH candidates, wherein the search space includes a first search space defined on the basis of the search space-related information, and a second search space having the same type as that of the first search space, wherein, when one portion of the first search space and the second search space overlap, at least one NPDCCH candidate, in the first search space, overlapping with the second search space is dropped.

10 Claims, 14 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 2018/0049246 A1* | 2/2018 | Park | H04W 4/70 |
| 2018/0049247 A1* | 2/2018 | Park | H04W 4/70 |
| 2018/0077690 A1* | 3/2018 | Park | H04W 76/40 |
| 2018/0123744 A1* | 5/2018 | Nogami | H04L 1/1854 |
| 2018/0124644 A1* | 5/2018 | Rico Alvarino | H04W 28/18 |

OTHER PUBLICATIONS

3GPP TSG-RAN WG1 Meeting #91 R1-1721144, Reno Nevada, USA Nov. 27-Dec. 1 (Year: 2017).*
Ericsson, "DL aspects of TDD for NB-IoT," 3GPP TSG-RAN WG1 #91, R1-1719361, Dec. 2017, 12 pages.
Nokia, "Downlink aspects of TDD support in NB-IoT," 3GPP TSG-RAN WG1 #91, R1-1720138, Dec. 2017, 7 pages.
Future lead Ericsson, "Summary of NB-IoT TDD Downlink aspects," 3GPP TSG-RAN WG1 #91, R1-1721144, Dec. 2017, 3 pages.
3rd Generation Partnership Project (3GPP), "Technical Specification Group Radio Access Network; Evolved Universal Terrestrial Radio Access (E-UTRA) and Evolved Packet Core (EPC); User Equipment (UE) conformance specification Part 3: Test Suites (Release 13)," 3GPP TS 36.523-3, V13.1.0, Dec. 2016, 613 pages.
PCT International Application No. PCT/KR2019/001642, International Searching Authority dated May 27, 2019, 4 pages.

* cited by examiner

【FIG. 1】
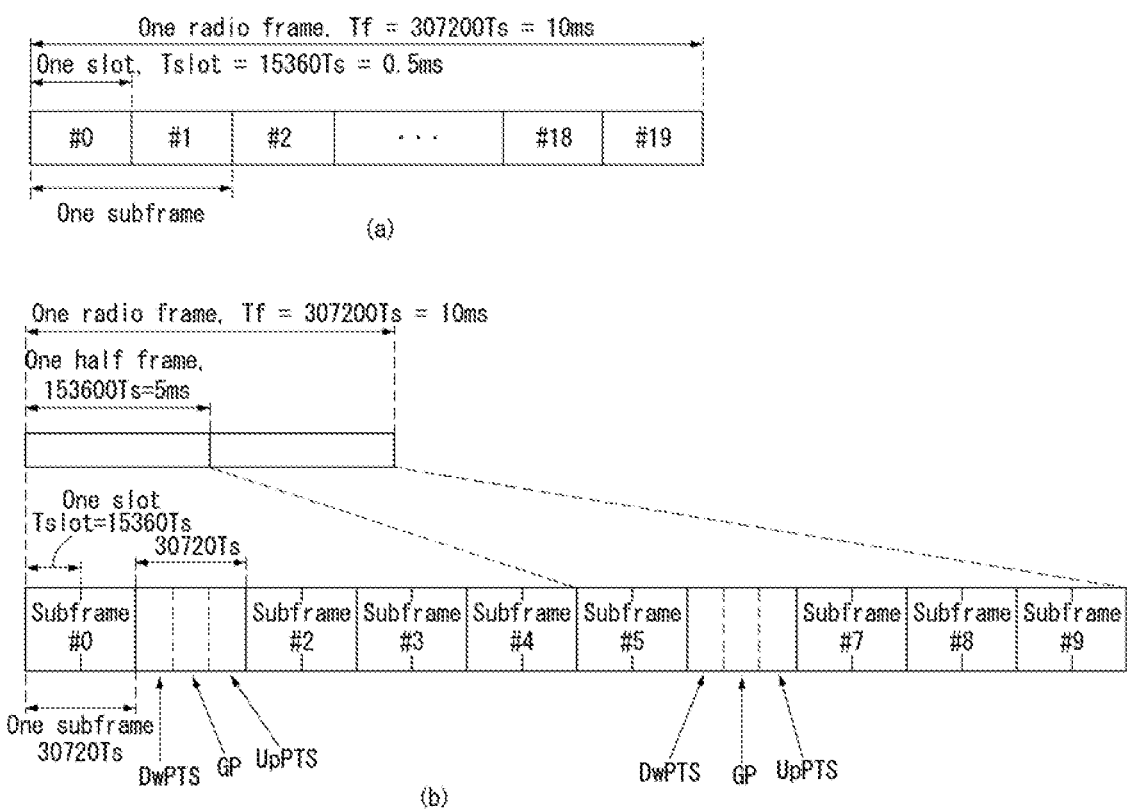

[FIG. 2]
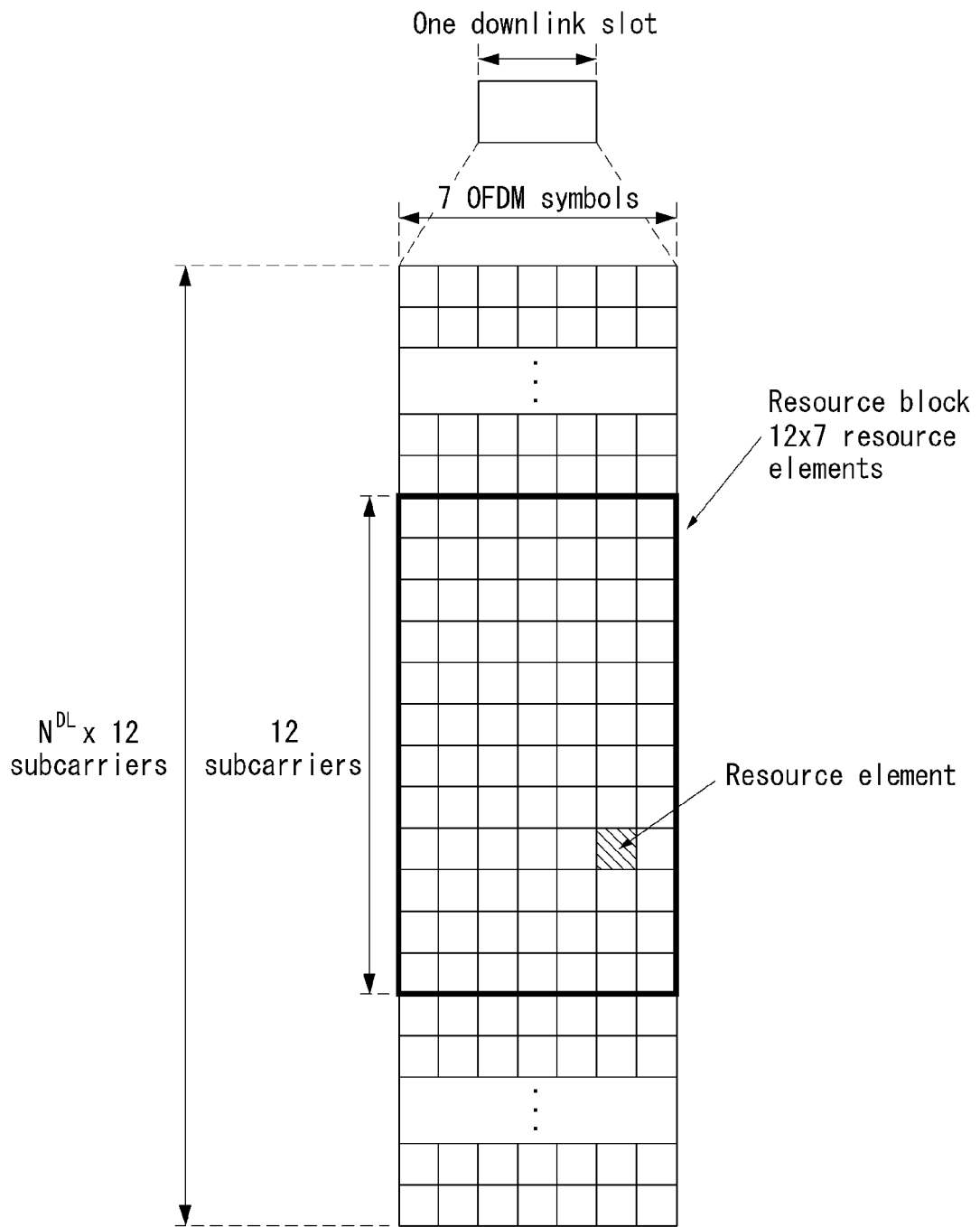

[FIG. 3]
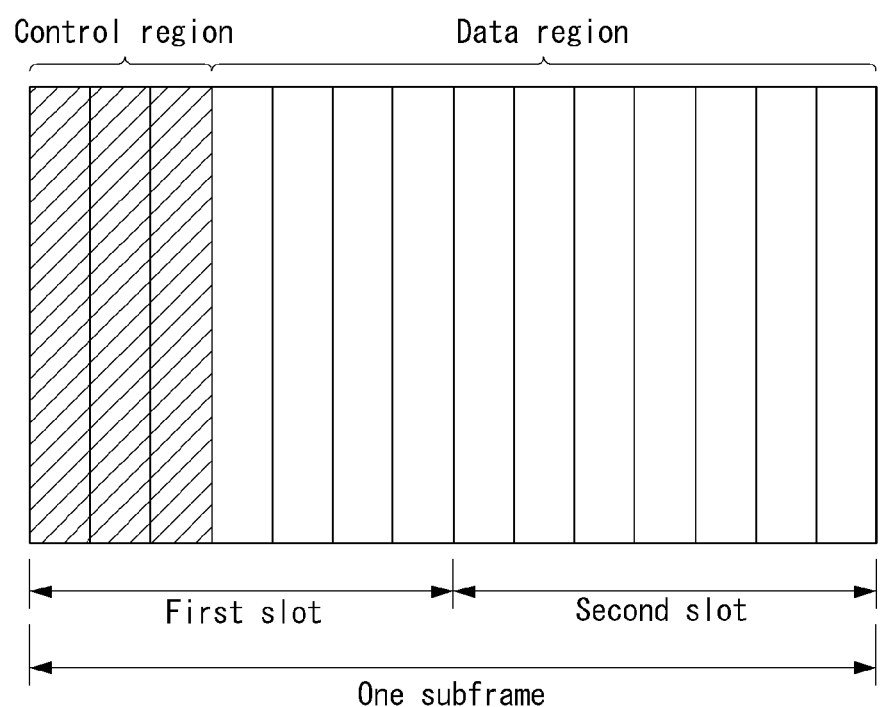
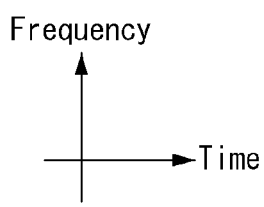

[FIG. 4]
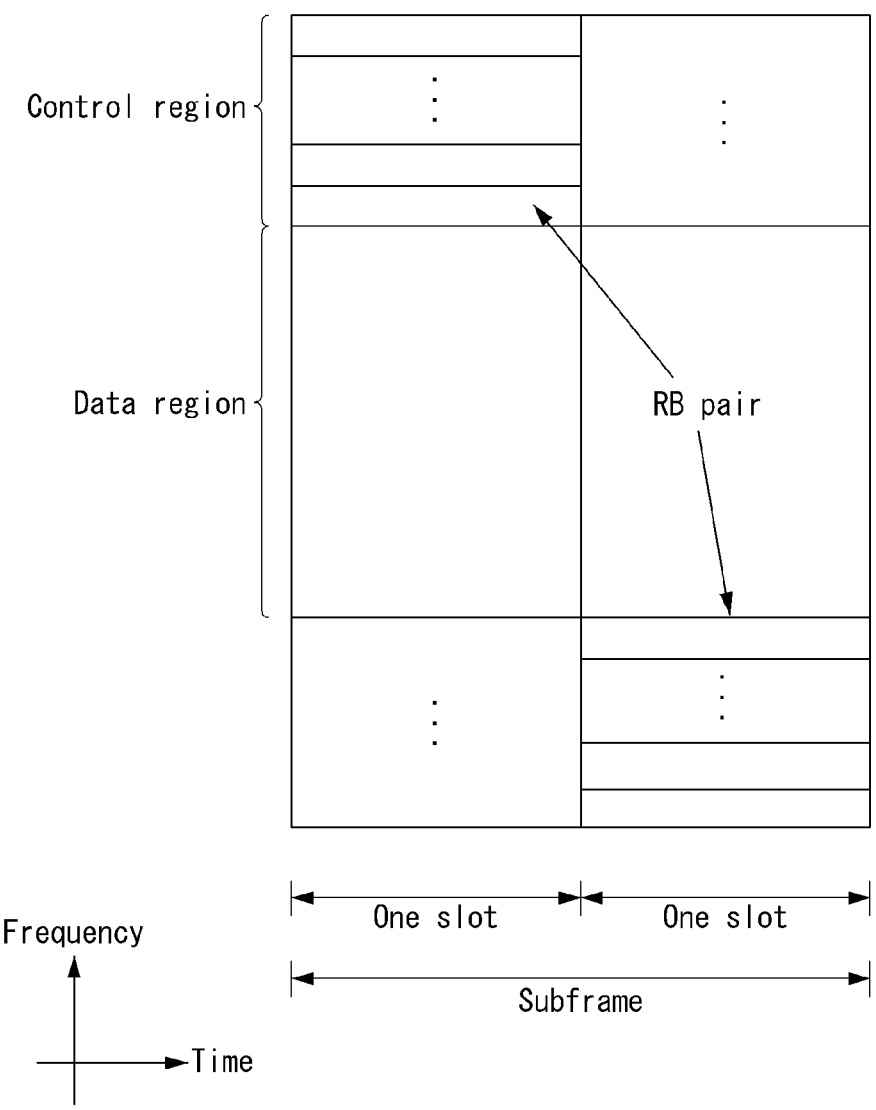

【FIG. 5】
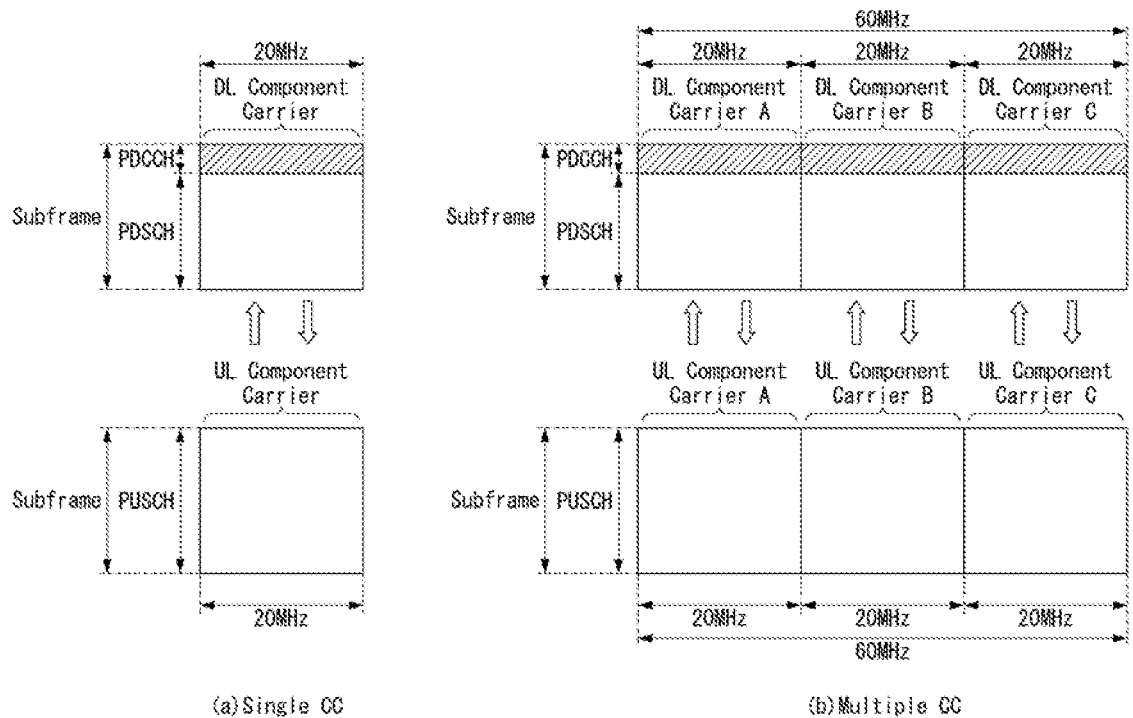
【FIG. 6】
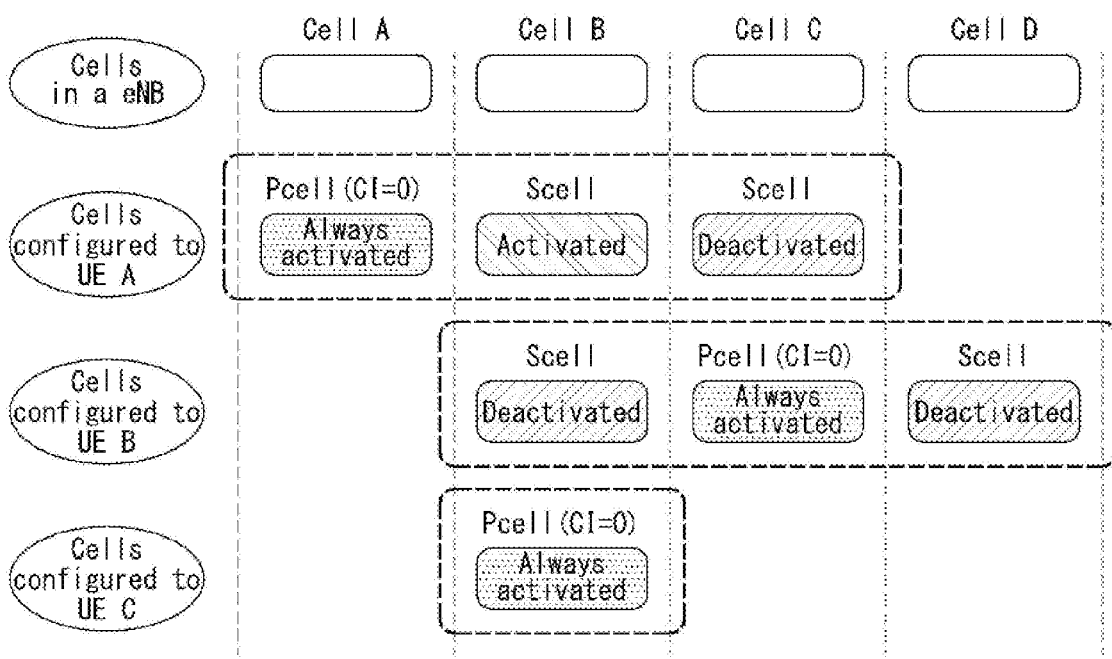

[FIG. 7]
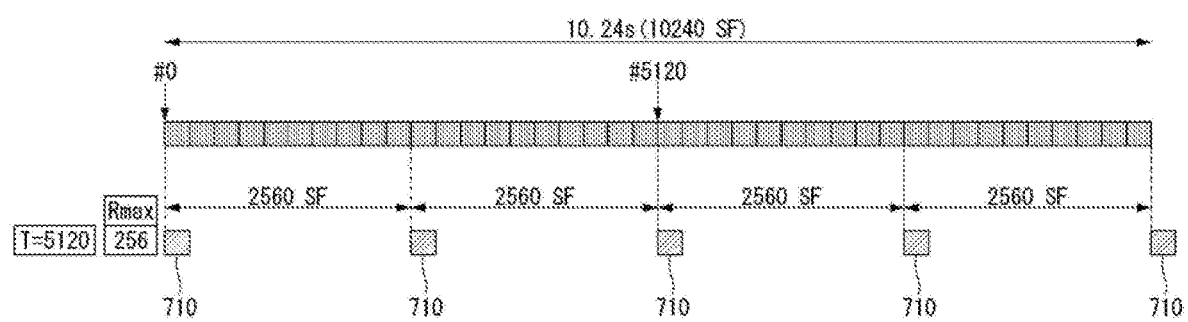

[FIG. 8]
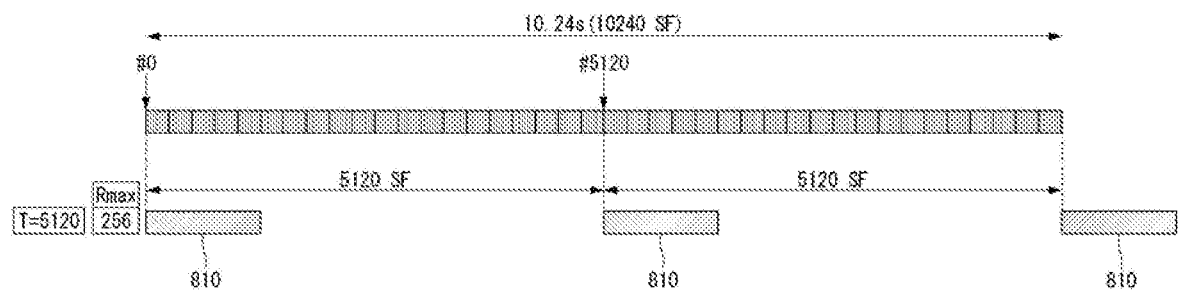

[FIG. 9]
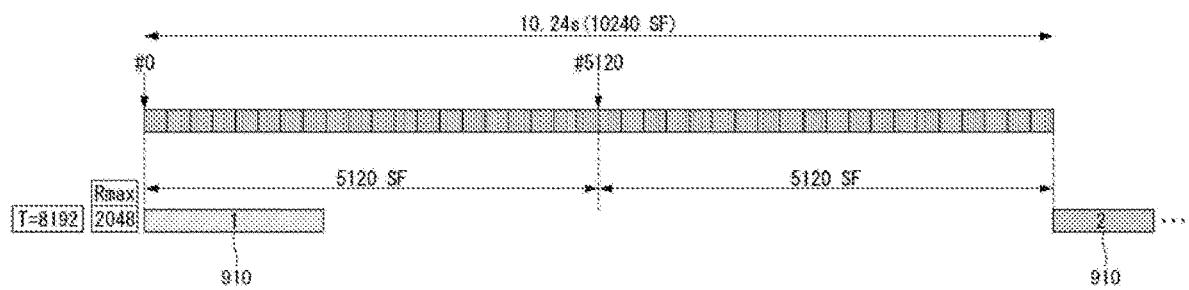

[FIG. 10]
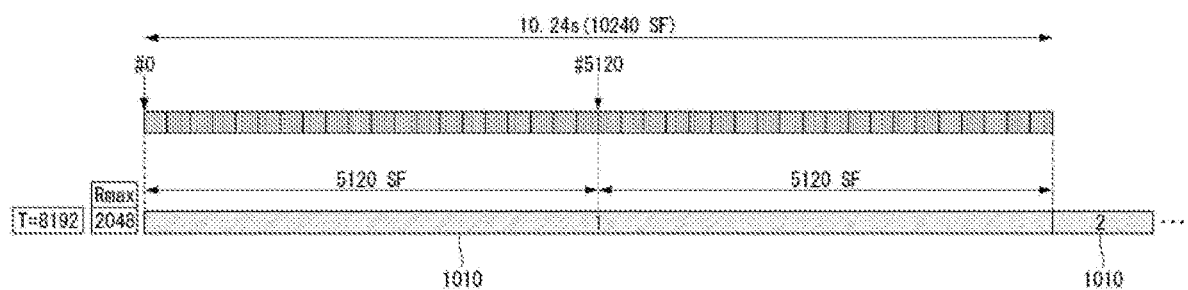

[FIG. 11]
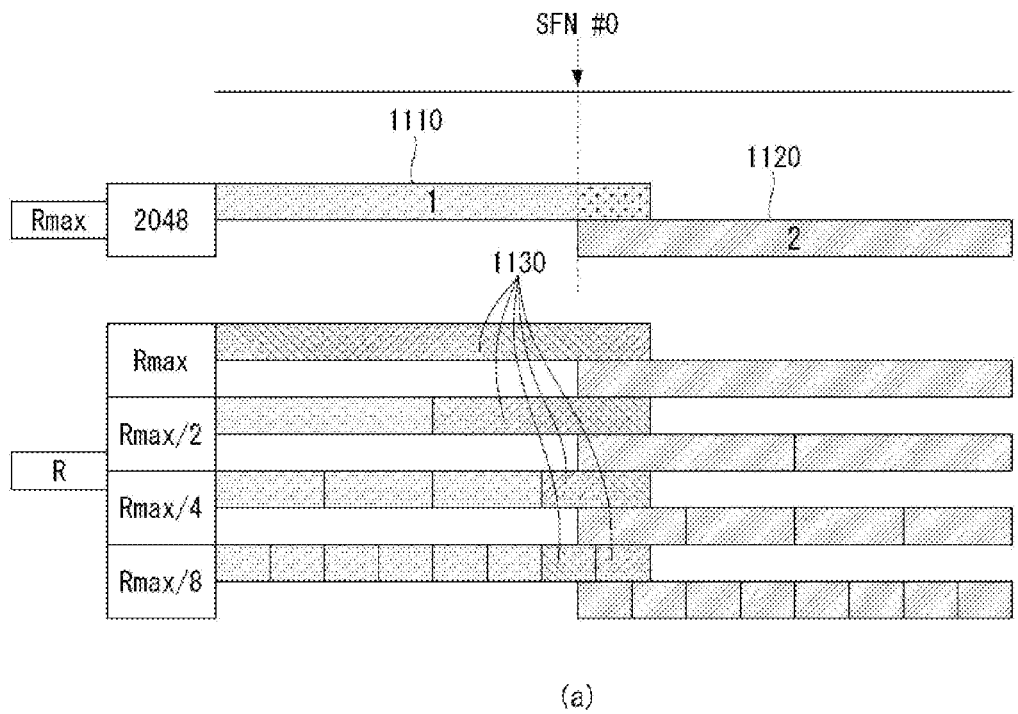
(a)
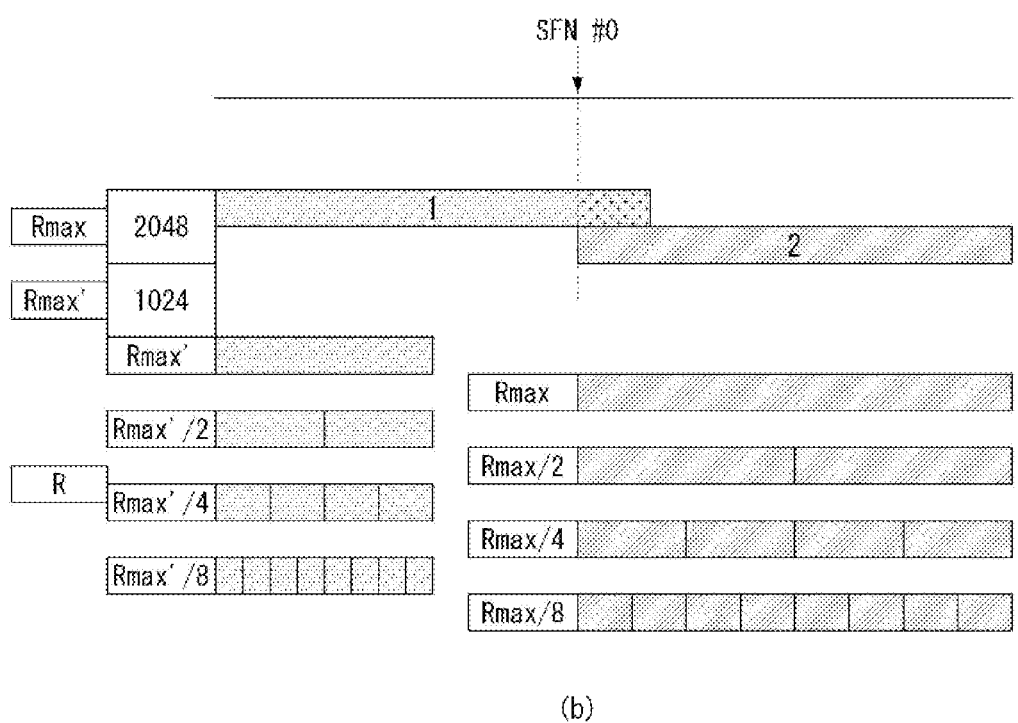
(b)

[FIG. 12]
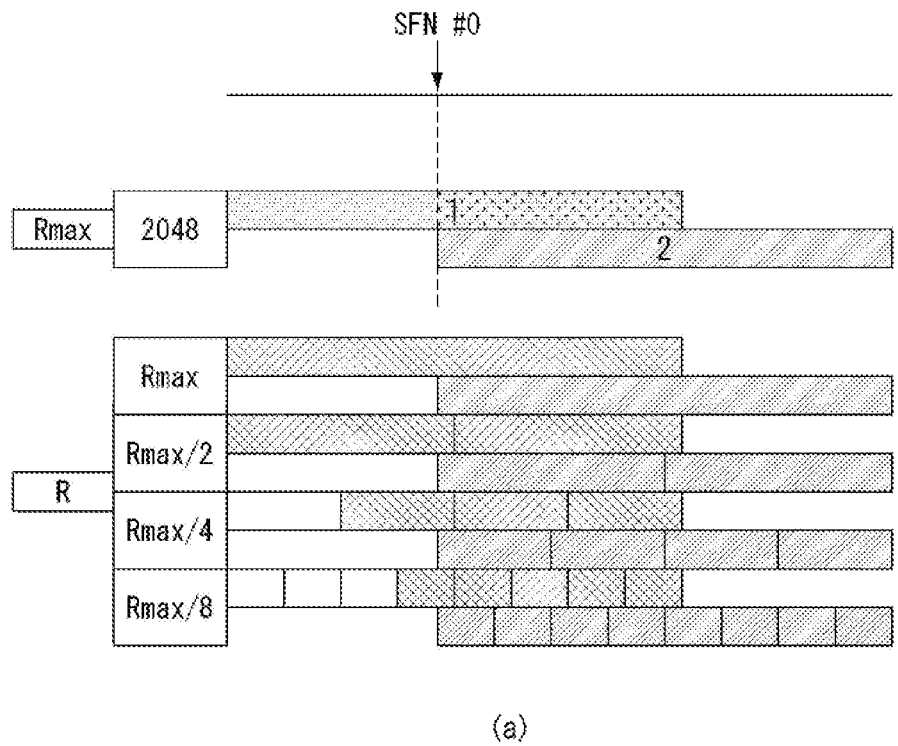
(a)
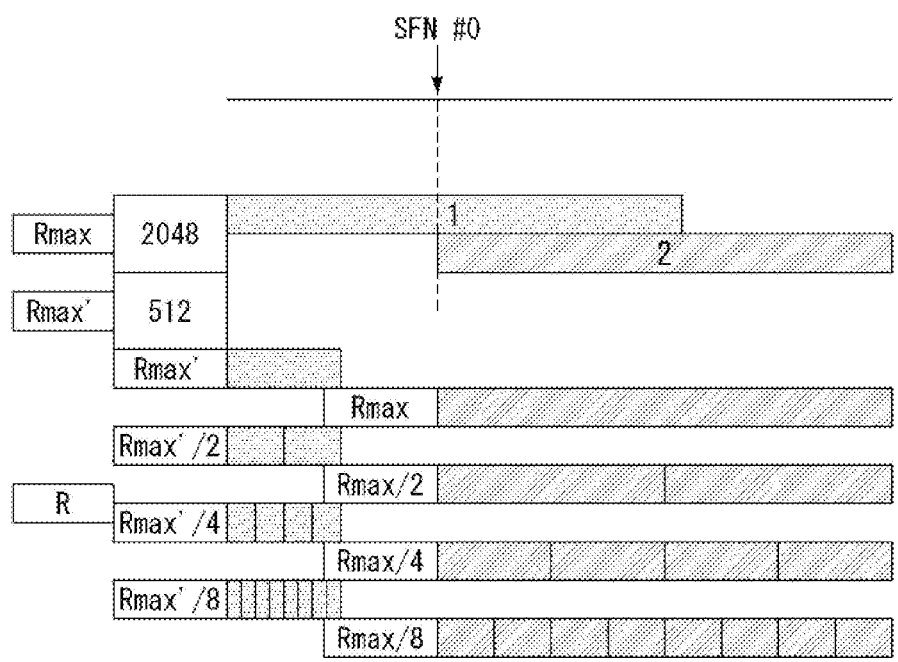
(b)

[FIG. 13]
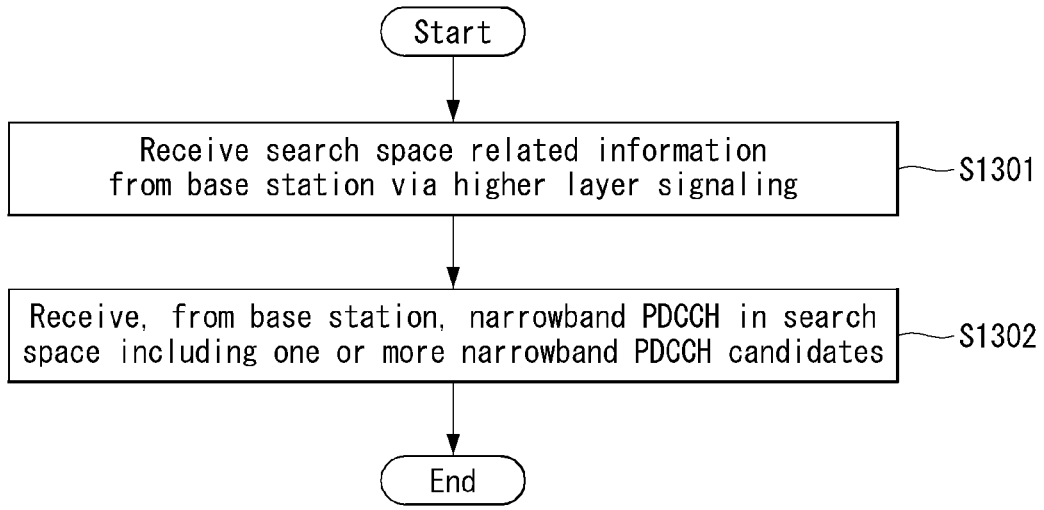
[FIG. 14]
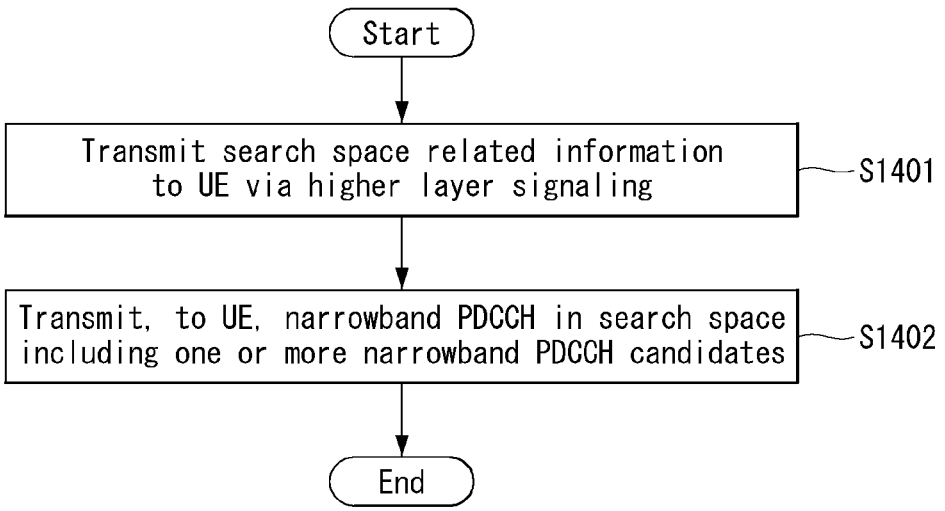

【FIG. 15】
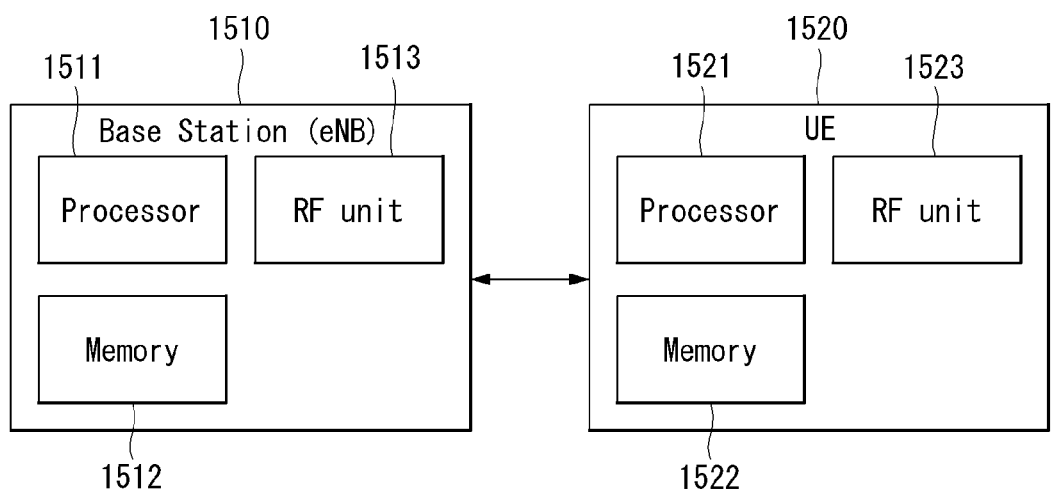

[FIG. 16]
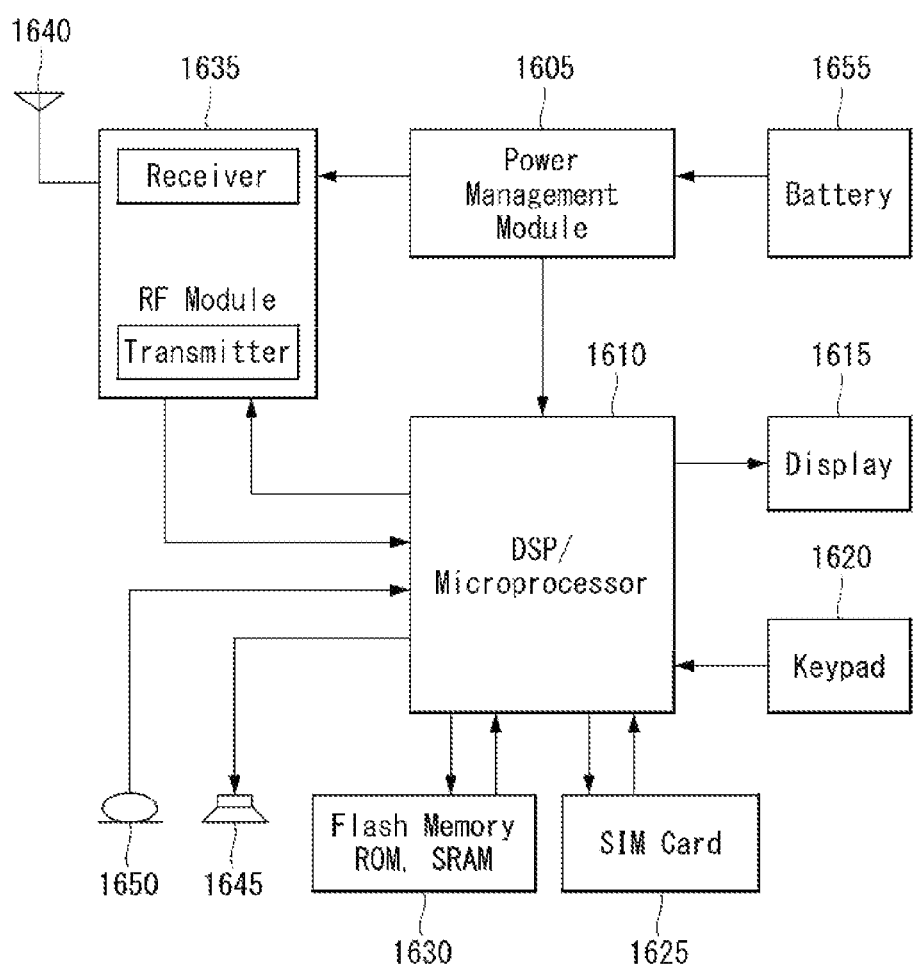

METHOD FOR TRANSMITTING/RECEIVING NARROWBAND PDCCH IN NARROWBAND-SUPPORTING WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/001642, filed on Feb. 11, 2019, which claims the benefit of earlier filing date and right of priority to Korean Application No. 10-2018-0053974, filed on May 10, 2018, and also claims the benefit of U.S. Provisional Application Nos. 62/629,110, filed on Feb. 11, 2018, and 62/668,769, filed on May 8, 2018, the contents of which are all incorporated by reference herein in their entireties.

TECHNICAL FIELD

The present disclosure relates to a wireless communication system supporting a narrowband, and more particularly to a method for transmitting and receiving a narrowband PDCCH in a search space and a device supporting the same.

BACKGROUND ART

Mobile communication systems have been developed to provide voice services, while ensuring the activity of users. However, coverage of the mobile communication systems has extended up to data services, as well as voice service. Today, an explosive increase in traffic has caused the shortage of resources. Accordingly, an advanced mobile communication system is necessary because users want relatively high speed services.

Requirements for a next-generation mobile communication system include the accommodation of explosive data traffic, a significant increase in the transfer rate per user, the accommodation of the number of considerably increased connection devices, very low end-to-end latency, and high energy efficiency. To this end, research of various technologies, such as dual connectivity, massive multiple input multiple output (MIMO), in-band full duplex, non-orthogonal multiple access (NOMA), super wideband, and device networking, is carried out.

DISCLOSURE

Technical Problem

The present disclosure provides a method for transmitting and receiving a narrowband PDCCH by dropping NPDCCH candidates overlapping a subsequent search space among a plurality of NPDCCH candidates included in a preceding search space when the same search spaces overlap each other in a wireless communication system supporting a narrowband.

Technical objects to be achieved in the disclosure are not limited to the above-described technical objects, and other technical objects not described above may be evidently understood by a person having ordinary skill in the art to which the disclosure pertains from the following description.

Technical Solution

In one aspect, there is provided a method for a user equipment (UE) to receive a narrowband physical downlink control channel (PDCCH) in a wireless communication system supporting a narrowband, the method comprising receiving, from a base station, search space related information via a higher layer signaling, and receiving, from the base station, the narrowband PDCCH (NPDCCH) in a search space including one or more narrowband PDCCH candidates, wherein the search space includes a first search space defined based on the search space related information and a second search space with the same type as the first search space, wherein when the first search space and the second search space partially overlap each other, the UE drops at least one narrowband PDCCH candidate of the first search space that overlaps the second search space.

The search space related information may include maximum repetition level information, starting subframe information, or subframe offset information.

The dropping of the at least one NPDCCH candidate may be when the UE operates in a time division duplex (TDD) system.

The first search space and the second search space may be a narrowband PDCCH UE-specific search space or a narrowband PDCCH common search space.

The common search space may be a Type 1-NPDCCH common search space, a Type 1A-NPDCCH common search space, a Type 2-NPDCCH common search space, or a Type 2A-NPDCCH common search space.

In another aspect, there is provided a user equipment (UE) configuring a search space in a wireless communication system supporting a narrowband, the UE comprising a transceiver configured to transmit and receive a radio signal, and a processor functionally connected to the transceiver, wherein the processor is configured to receive, from a base station, search space related information via a higher layer signaling, and receive, from the base station, a narrowband physical downlink control channel (PDCCH) in a search space including one or more narrowband PDCCH (NPDCCH) candidates, wherein the search space includes a first search space defined based on the search space related information and a second search space with the same type as the first search space, wherein when the first search space and the second search space partially overlap each other, the UE drops at least one narrowband PDCCH candidate of the first search space that overlaps the second search space.

The search space related information may include maximum repetition level information, starting subframe information, or subframe offset information.

The dropping of the at least one NPDCCH candidate may be when the UE operates in a time division duplex (TDD) system.

The first search space and the second search space may be a narrowband PDCCH UE-specific search space or a narrowband PDCCH common search space.

The common search space may be a Type 1-NPDCCH common search space, a Type 1A-NPDCCH common search space, a Type 2-NPDCCH common search space, or a Type 2A-NPDCCH common search space.

Advantageous Effects

Embodiments of the present disclosure can transmit and receive signals more accurately and increase efficiency of resource use by transmitting and receiving a narrowband PDCCH by dropping NPDCCH candidates overlapping a subsequent search space among a plurality of NPDCCH candidates included in a preceding search space when the same search spaces overlap each other in a wireless communication system supporting a narrowband.

Effects which may be obtained in the disclosure are not limited to the above-described effects, and other technical effects not described above may be evidently understood by a person having ordinary skill in the art to which the disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates the structure of a radio frame in a wireless communication system to which the disclosure may be applied.

FIG. 2 illustrates a resource grid for one downlink slot in a wireless communication system to which the disclosure may be applied.

FIG. 3 illustrates the structure of a downlink subframe in a wireless communication system to which the disclosure may be applied.

FIG. 4 illustrates the structure of an uplink subframe in a wireless communication system to which the disclosure may be applied.

FIG. 5 illustrates an example of component carriers and carrier aggregation (CA) in a wireless communication system to which the present disclosure is applicable.

FIG. 6 illustrates a classification of cells of a system supporting a carrier aggregation.

FIG. 7 illustrates a method of configuring a search space in a FDD eMTC system.

FIG. 8 illustrates a method of configuring a search space in a TDD eMTC system.

FIG. 9 illustrates a method of configuring a search space in a FDD NB-IoT system.

FIG. 10 illustrates a method of configuring a search space in a TDD NB-IoT system.

FIG. 11 illustrates a method of configuring a search space according to an embodiment of the present disclosure.

FIG. 12 illustrates another example of a method of configuring a search space according to an embodiment of the present disclosure.

FIG. 13 is a flow chart illustrating a method for a user equipment to receive a narrowband PDCCH in a wireless communication system according to an embodiment of the present disclosure.

FIG. 14 is a flow chart illustrating a method for a base station to transmit a narrowband PDCCH in a wireless communication system according to an embodiment of the present disclosure.

FIG. 15 illustrates a block configuration diagram of a wireless communication device to which methods described in the present disclosure are applicable.

FIG. 16 illustrates a block configuration diagram of a communication device according to an embodiment of the present disclosure.

MODE FOR INVENTION

Hereafter, preferred embodiments of the disclosure will be described in detail with reference to the accompanying drawings. A detailed description to be disclosed hereinafter together with the accompanying drawing is to describe embodiments of the disclosure and not to describe a unique embodiment for carrying out the disclosure. The detailed description below includes details in order to provide a complete understanding. However, those skilled in the art know that the disclosure can be carried out without the details.

In some cases, in order to prevent a concept of the disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A is primarily described for clear description, but technical features of the disclosure are not limited thereto.

Overview of System

FIG. 1 illustrates the structure of a radio frame in a wireless communication system to which the disclosure may be applied.

3GPP LTE/LTE-A supports radio frame structure type 1 applicable to frequency division duplex (FDD) and radio frame structure Type 2 applicable to time division duplex (TDD).

In FIG. 1, the size of a radio frame in a time domain is represented as a multiple of a time unit of $T\_s=1/(15000*2048)$. Downlink and uplink transmissions are organized into radio frames with a duration of $T\_f=307200*T\_s=10$ ms.

FIG. 1(a) illustrates radio frame structure type 1. The radio frame structure type 1 may be applied to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive sub-carriers in one slot.

FIG. 1(b) illustrates frame structure type 2.

The radio frame type 2 consists of two half-frames of $153600*T\_s=5$ ms length each. Each half-frame consists of five subframes of $30720*T\_s=1$ ms length.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS).

The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of $T\_slot=15360*T\_s=0.5$ ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

In Table 2, X is the number of additional SC-FDNA symbols transferred to higher layer parameter srs-UpPtsAdd, and is 0 when the higher layer parameter srs-UpPtsAdd is not transferred.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame according to an example of FIG. 1 is merely an example, and the number of subcarriers included in a radio frame, the number of slots included in a subframe, and the number of OFDM symbols included in a slot may be variously changed.

FIG. 2 is a diagram illustrating a resource grid for one downlink slot in the wireless communication system to which the disclosure may be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates the structure of a downlink subframe in the wireless communication system to which the disclosure may be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 4 illustrates the structure of an uplink subframe in the wireless communication system to which the disclosure may be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Overview of Carrier Aggregation

In embodiments of the present disclosure, a communication environment to be considered includes all multi-carrier supporting environments. That is, a multi-carrier system or a carrier aggregation (CA) system used in the present disclosure refers to a system that aggregates and uses one or more component carriers (CCs) with a bandwidth less than a target band when configuring a target wideband, in order to support a wideband.

In the present disclosure, multi-carrier means aggregation of carriers (or carrier aggregation). In this instance, the aggregation of carriers means both aggregation between continuous carriers and aggregation between non-contiguous carriers. Further, the number of component carriers aggregated between downlink and uplink may be differently set. A case where the number of downlink component carriers (hereinafter referred to as "DL CC") and the number of uplink component carriers (hereinafter, referred to as "UL CC") are the same is referred to as "symmetric aggregation", and a case where the number of downlink component carriers and the number of uplink component carriers are different is referred to as "asymmetric aggregation". The carrier aggregation may be used interchangeably with a term such as bandwidth aggregation or spectrum aggregation.

Carrier aggregation configured by combining two or more component carriers aims at supporting up to a bandwidth of 100 MHz in the LTE-A system. When one or more carriers with a bandwidth less than a target band are combined, a bandwidth of the combined carriers may be limited to a bandwidth used in an existing system in order to maintain backward compatibility with the existing IMT system. For example, the existing 3GPP LTE system supports bandwidths of {1.4, 3, 5, 10, 15, 20} MHz, and a 3GPP LTE-advanced (i.e., LTE-A) system may be configured to support a bandwidth greater than 20 MHz by using only the bandwidths for compatibility with the existing system. Further, the carrier aggregation system used in the preset disclosure may be configured to support the carrier aggregation by defining a new bandwidth regardless of the bandwidth used in the existing system.

The LTE-A system uses a concept of a cell to manage radio resources.

An environment of the carrier aggregation described above may be called a multi-cell environment. The cell is defined as a combination of a pair of a downlink resource (DL CC) and an uplink resource (UL CC), but the uplink resource is not essential. Therefore, the cell may consist of only the downlink resource or both the downlink resource and the uplink resource. If a specific UE has only one configured serving cell, the cell may have one DL CC and one UL CC. However, if the specific UE has two or more configured serving cells, the cells have DL CCs as many as the cells, and the number of UL CCs may be equal to or less than the number of DL CCs.

Alternatively, on the contrary, the DL CC and the UL CC may be configured. That is, when the specific UE has multiple configured serving cells, a carrier aggregation environment, in which the number of UL CCs is more than the number of DL CCs, may also be supported. That is, the carrier aggregation may be understood as aggregation of two or more cells each having a different carrier frequency (center frequency). The 'cell' described here should be distinguished from a 'cell' as a region which is generally used and is covered by the base station.

The cell used in the LTE-A system includes a primary cell (PCell) and a secondary cell (SCell). The PCell and the SCell may be used as a serving cell. For the UE which is in an RRC_CONNECTED state, but does not have the configured carrier aggregation or does not support the carrier aggregation, only one serving cell consisting of only the PCell exists. On the other hand, for the UE which is in the RRC_CONNECTED state and has the configured carrier aggregation, one or more serving cells may exist, and the PCell and one or more SCells are included in all serving cells.

The serving cell (PCell and SCell) may be configured through an RRC parameter. PhysCellId as a physical layer identifier of the cell has integer values of 0 to 503. SCellIndex as a short identifier used to identify the SCell has integer values of 1 to 7. ServCellIndex as a short identifier used to identify the serving cell (PCell or SCell) has integer values of 0 to 7. The value of 0 is applied to the PCell, and SCellIndex is previously given for applying to the SCell. That is, a cell having a smallest cell ID (or cell index) in ServCellIndex is the PCell.

The PCell means a cell that operates on a primary frequency (or primary CC). The PCell may be used for the UE to perform an initial connection establishment process or a connection re-establishment process and may be designated as a cell indicated in a handover process. Further, the PCell means a cell which is the center of control-related communication among serving cells configured in the carrier aggregation environment. That is, the UE may be allocated and transmit a PUCCH only in a PCell of the corresponding UE and use only the PCell to acquire system information or change a monitoring procedure. An evolved universal terrestrial radio access (E-UTRAN) may change only the PCell for the handover procedure to the UE supporting the carrier aggregation environment by using an RRC connection reconfiguration message RRCConnectionReconfigutaion of higher layer including mobile control information mobilityControlInfo.

The SCell may mean a cell that operates on a secondary frequency (or secondary CC). Only one PCell may be allocated to a specific UE, and one or more SCells may be allocated to the specific UE. The SCell can be configured after RRC connection establishment is achieved and used to provide an additional radio resource. The PUCCH does not exist in residual cells, i.e., the SCells excluding the PCell from the serving cells configured in the carrier aggregation environment. The E-UTRAN may provide all system information related to an operation of a related cell, which is in an RRC_CONNECTED state, through a dedicated signal when adding the SCells to the UE that supports the carrier aggregation environment. A change of the system information may be controlled by releasing and adding the related SCell, and in this case, the RRC connection reconfiguration message RRCConnectionReconfigutaion of higher layer may be used. The E-UTRAN may perform dedicated signaling having a different parameter for each UE rather than broadcasting in the related SCell.

After an initial security activation process starts, the E-UTRAN can add the SCells to the initially configured PCell in the connection establishment process to configure a network including one or more SCells. In the carrier aggregation environment, the PCell and the SCell may operate as the respective component carriers. In embodiments described below, a primary component carrier (PCC) may be used as the same meaning as the PCell, and a secondary component carrier (SCC) may be used as the same meaning as the SCell.

FIG. 5 illustrates an example of component carriers and carrier aggregation in a wireless communication system to which the present disclosure is applicable.

(a) of FIG. 5 illustrates a single carrier structure used in the LTE system. A component carrier includes a DL CC and an UL CC. One component carrier may have a frequency range of 20 MHz.

(b) of FIG. 5 illustrates a carrier aggregation structure used in the LTE-A system. More specifically, (b) of FIG. 5 illustrates that three component carriers having a frequency magnitude of 20 MHz are combined. Three DL CCs and three UL CCs are provided, but the number of DL CCs and the number of UL CCs are not limited. In the case of carrier aggregation, the UE may simultaneously monitor three CCs, receive downlink signal/data, and transmit uplink signal/data.

If N DL CCs are managed in a specific cell, the network may allocate M (M≤N) DL CCs to the UE. In this instance, the UE may monitor only M limited DL CCs and receive the DL signal. Further, the network may prioritize L (L≤M≤N) DL CCs and allocate a primary DL CC to the UE. In this case, the UE has to monitor the L DL CCs. Such a scheme may be equally applied to uplink transmission.

A linkage between a carrier frequency of a downlink resource (or DL CC) and a carrier frequency of an uplink resource (or UL CC) may be indicated by a higher layer message, such as a RRC message, or system information. For example, a combination of the DL resource and the UL resource may be configured by a linkage defined by system information block type 2 (SIB2). More specifically, the linkage may mean a mapping relation between the DL CC, on which a PDCCH carrying a UL grant is transmitted, and the UL CC using the UL grant, and mean a mapping relation between the DL CC (or UL CC) on which data for HARQ is transmitted and the UL CC (or DL CC) on which HARQ ACK/NACK signal is transmitted.

FIG. 6 illustrates a classification of cells of a system supporting a carrier aggregation.

Referring to FIG. 6, a configured cell is a cell that can be subject to a carrier aggregation based on a measurement report among cells of a base station as illustrated in FIG. 5 and may be configured for each UE. The configured cell may previously reserve resources for ACK/NACK transmission for PDSCH transmission. An activated cell is a cell that is configured to actually transmit PDSCH/PUSCH among configured cells and performs channel state information (CSI) report for PDSCH/PUSCH transmission and sounding reference signal (SRS) transmission. A deactivated cell is a cell that is configured not to perform PDSCH/PUSCH transmission in response to a command of base station or a timer operation and may stop the CSI report and the SRS transmission.

Downlink Control Channel Related Procedure in NB-IoT

A procedure related to a narrowband physical downlink control channel (NPDCCH) used in NB-IoT is described below.

A UE needs to monitor NPDCCH candidates (i.e., a set of NPDCCH candidates) as configured by higher layer signaling for control information. The monitoring may imply attempting to decode each of the NPDCCHs in the set according to all the monitored DCI formats. The set of NPDCCH candidates to monitor may be defined in terms of NPDCCH search spaces. In this case, the UE may perform the monitoring using an identifier (e.g., C-RNTI, P-RNTI, SC-RNTI, G-RNTI) corresponding to the corresponding NPDCCH search space.

In this case, the UE needs to monitor one or more of a) Type1-NPDCCH common search space, b) Type1A-NPDCCH common search space, c) Type2-NPDCCH common search space, d) Type2A-NPDCCH common search space, and e) NPDCCH UE-specific search space.

In this instance, the UE is not required to simultaneously monitor the NPDCCH UE-specific search space and the Type1-NPDCCH common search space.

The UE is not required to simultaneously monitor the NPDCCH UE-specific search space and the Type2-NPDCCH common search space.

The UE is not required to simultaneously monitor the Type1-NPDCCH common search space and the Type2-NPDCCH common search space.

The UE is not required to monitor the Type1A-NPDCCH common search space or the Type2A-NPDCCH common search space in subframes, in which the UE monitors the Type1-NPDCCH common search space, or in subframes in which the UE receives NPDSCH assigned by NPDCCH with downlink control information (DCI) CRC scrambled by P-RNTI.

The UE is not required to monitor the Type1A-NPDCCH common search space or the Type2A-NPDCCH common search space in subframes, in which the UE monitors the Type1-NPDCCH common search space, or in subframes in which the UE receives NPDSCH assigned by NPDCCH with DCI CRC scrambled by C-RNTI Temporary C-RNTI.

The UE is not required to monitor the Type2A-NPDCCH common search space in the same subframe in which the UE monitors the Type1A-NPDCCH common search space.

The UE is not required to monitor the Type1A-NPDCCH common search space in subframes in which the UE receives NPDSCH assigned by NPDCCH with DCI CRC scrambled by SC-RNTI.

The UE is not required to monitor the Type2A-NPDCCH common search space in subframes in which the UE receives NPDSCH assigned by NPDCCH with DCI CRC scrambled by G-RNTI or SC-RNTI.

search spaces and the corresponding monitored NPDCCH candidates are listed in Table 4 by substituting the value of $R_{max}$ with higher layer configured parameter npdcch-NumRepetitions-SC-MCCH.

TABLE 4

| $R_{max}$ | R | | | | | | | | L' = 1 | NCCE indices of monitored NPDCCH candidates L' = 2 |
|---|---|---|---|---|---|---|---|---|---|---|
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| 128 | 1 | 2 | 4 | 8 | 16 | 32 | 64 | 128 | — | {0, 1} |
| 256 | 1 | 4 | 8 | 16 | 32 | 64 | 128 | 256 | — | {0, 1} |
| 512 | 1 | 4 | 16 | 32 | 64 | 128 | 256 | 512 | — | {0, 1} |
| 1024 | 1 | 8 | 32 | 64 | 128 | 256 | 512 | 1024 | — | {0, 1} |
| 2048 | 1 | 8 | 64 | 128 | 256 | 512 | 1024 | 2048 | — | {0, 1} |
| DCI subframe repetition number | 000 | 001 | 010 | 011 | 100 | 101 | 110 | 111 | | |

Note 1:
{x, y} denotes NPDCCH format 1 candidate corresponding to NCCEs 'x' and 'y'.

An NPDCCH search space at an aggregation level and a repetition level is defined by a set of NPDCCH candidates. Here, each NPDCCH candidate is repeated in R consecutive NB-IoT downlink subframes excluding subframes used for transmission of system information (SI) messages starting with a subframe k.

For the NPDCCH UE-specific search space, the aggregation and repetition levels defining the corresponding search spaces and the corresponding monitored NPDCCH candidates are listed in Table 3 by substituting the value of $R_{max}$ with higher layer configured parameter npdcch-NumRepetitions.

For the Type2-NPDCCH common search space, the aggregation and repetition levels defining the corresponding search spaces and the corresponding monitored NPDCCH candidates are listed in Table 5 by substituting the value of $R_{max}$ with higher layer configured parameter npdcch-NumRepetitions-RA.

For the Type2A-NPDCCH common search space, the aggregation and repetition levels defining the corresponding search spaces and the corresponding monitored NPDCCH candidates are listed in Table 5 by substituting the value of $R_{max}$ with higher layer configured parameter npdcch-NumRepetitions-SC-MTCH.

TABLE 3

| $R_{max}$ | R | DCI subframe repetition number | NCCE indices of monitored NPDCCH candidates L' = 1 | L' = 2 |
|---|---|---|---|---|
| 1 | 1 | 00 | {0}, {1} | {0, 1} |
| 2 | 1 | 00 | {0}, {1} | {0, 1} |
| | 2 | 01 | — | {0, 1} |
| 4 | 1 | 00 | — | {0, 1} |
| | 2 | 01 | — | {0, 1} |
| | 4 | 10 | — | {0, 1} |
| >=8 | $R_{max}/8$ | 00 | — | {0, 1} |
| | $R_{max}/4$ | 01 | — | {0, 1} |
| | $R_{max}/2$ | 10 | — | {0, 1} |
| | $R_{max}$ | 11 | — | {0, 1} |

Note 1:
{x}, {y} denotes NPDCCH format 0 candidate with NCCE index 'x' and NPDCCH format 0 candidate with NCCE index 'y'.
Note 2:
{x, y} denotes NPDCCH format 1 candidate corresponding to NCCEs 'x' and 'y'.

For the Type1-NPDCCH common search space, the aggregation and repetition levels defining the corresponding search spaces and the corresponding monitored NPDCCH candidates are listed in Table 4 by substituting the value of $R_{max}$ with higher layer configured parameter npdcch-NumRepetitionPaging.

For the Type 1A-NPDCCH common search space, the aggregation and repetition levels defining the corresponding

TABLE 5

| $R_{max}$ | R | DCI subframe repetition number | NCCE indices of monitored NPDCCH candidates L' = 1 | L' = 2 |
|---|---|---|---|---|
| 1 | 1 | 00 | — | {0, 1} |
| 2 | 1 | 00 | — | {0, 1} |
| | 2 | 01 | — | {0, 1} |
| 4 | 1 | 00 | — | {0, 1} |
| | 2 | 01 | — | {0, 1} |
| | 4 | 10 | — | {0, 1} |
| >=8 | $R_{max}/8$ | 00 | — | {0, 1} |
| | $R_{max}/4$ | 01 | — | {0, 1} |
| | $R_{max}/2$ | 10 | — | {0, 1} |
| | $R_{max}$ | 11 | — | {0, 1} |

Note 1:
{x, y} denotes NPDCCH format 1 candidate corresponding to NCCEs 'x' and 'y'.

If a NB-IoT UE is configured with higher layer parameter twoHARQ-ProcessesConfig, and if the NB-IoT UE detects NPDCCH with DCI format N0 ending in a subframe n, and if the corresponding NPUSCH format 1 transmission starts from a subframe n+k, the UE is not required to monitor the NPDCCH in any subframe starting within the range from a subframe n+k−2 to a subframe n+k−1.

On the other hand, if the NB-IoT UE is not configured with higher layer parameter twoHARQ-ProcessesConfig, and if the NB-IoT UE detects NPDCCH with DCI format N0 ending in a subframe n or receives NPDSCH carrying a random access response grant ending in a subframe N, and if the corresponding NPUSCH format 1 transmission starts from a subframe n+k, the UE is not required to monitor the NPDCCH in any subframe starting within the range from a subframe n+1 to a subframe n+k−1.

For the NPDCCH UE-specific search space, if a NB-IoT UE is configured with higher layer parameter twoHARQ-ProcessesConfig, and if the NB-IoT UE detects NPDCCH with DCI format N1 or N2 ending in a subframe n, and if a corresponding NPDSCH transmission starts from a subframe n+k, the UE is not required to monitor the NPDCCH in any subframe starting within the range from a subframe n+k−2 to a subframe n+k−1.

On the other hand, if the NB-IoT UE is not configured with higher layer parameter twoHARQ-ProcessesConfig, and if the NB-IoT UE detects NPDCCH with DCI format N1 or N2 ending in a subframe n, and if a corresponding NPDSCH transmission starts from a subframe n+k, the UE is not required to monitor the NPDCCH in any subframe starting within the range from a subframe n+1 to a subframe n+k−1.

If a NB-IoT UE detects NPDCCH with DCI format N1 ending in a subframe n, and if the corresponding NPDSCH transmission starts from a subframe n+k, and if the corresponding NPUSCH format 2 transmission starts from a subframe n+m, the UE is not required to monitor NPDCCH in any subframe starting within the range from a subframe n+k to a subframe n+m−1.

If a NB-IoT UE detects NPDCCH with DCI format N1 for "PDCCH order" ending in a subframe n, and if the corresponding NPRACH transmission starts from a subframe n+k, the UE is not required to monitor NPDCCH in any subframe starting within the range from a subframe n+1 to a subframe n+k−1.

If a NB-IoT UE is configured with higher layer parameter twoHARQ-ProcessesConfig, and if the NB-IoT UE has a NPUSCH transmission ending in a subframe n, the UE is not required to receive any transmission in a subframe n+1.

On the other hand, if the NB-IoT UE is not configured with higher layer parameter twoHARQ-ProcessesConfig, and if the NB-IoT UE has a NPUSCH transmission ending in a subframe n, the UE is not required to monitor NPDCCH in any subframe starting within the range from a subframe n+1 to a subframe n+3.

If a NB-IoT UE receives a NPDSCH transmission ending in a subframe n, and if the NB-IoT UE is not required to transmit a corresponding NPUSCH format 2, the UE is not required to monitor NPDCCH in any subframe starting within the range from a subframe n+1 to a subframe n+12.

If a NB-IoT UE is configured with higher layer parameter twoHARQ-ProcessesConfig, and if NPDCCH candidates end in a subframe n, and if the NB-IoT UE is configured to monitor NPDCCH candidates of another NPDCCH search space starting in a subframe k0 before a subframe n+5, the UE is not required to monitor an NPDCCH candidate of an NPDCCH search space.

On the other hand, if the NB-IoT UE is not configured with higher layer parameter twoHARQ-ProcessesConfig, and if NPDCCH candidates of an NPDCCH search space end in a subframe n, and if the NB-IoT UE is configured to monitor NPDCCH candidates of another NPDCCH search space starting in a subframe k0 before a subframe n+5, the UE is not required to monitor NPDCCH candidates of the NPDCCH search space.

A NB-IoT UE is not required to monitor NPDCCH candidates of an NPDCCH search space during an NPUSCH UL gap.

With regard to an NPDCCH starting position, a starting OFDM symbol for NPDCCH is given by an index $l_{NPDCCHStart}$ in a first slot of a subframe k. In this instance, if higher layer parameter eutraControlRegionSize is present, the index $l_{NPDCCHStart}$ is given by the higher layer parameter eutaControlRegionSize. On the contrary, if the higher layer parameter eutraControlRegionSize is not present, the index $l_{NPDCCHStart}$ is 0.

With regard to an NPDCCH control information procedure, the UE discards the corresponding NPDCCH if consistent control information is not detected.

The following Table 6 represents NPRACH-ConfigSIB-NB information elements.

TABLE 6

```
-- ASN1START
NPRACH-ConfigSIB-NB-r13 ::=                    SEQUENCE {
    nprach-CP-Length-r13                       ENUMERATED {us66dot7, us266dot7},
    rsrp-ThresholdsPrachInfoList-r13                     RSRP-ThresholdsNPRACH-InfoList-NB-r13 OPTIONAL, -- need OR
    nprach-ParametersList-r13                  NPRACH-ParametersList-NB-r13
}
NPRACH-ConfigSIB-NB-v1330 ::=                  SEQUENCE {
    nprach-ParametersList-v1330                    NPRACH-ParametersList-NB-v1330
}
NPRACH-ParametersList-NB-r13 ::=               SEQUENCE (SIZE (1.. maxNPRACH-Resources-NB-r13)) OF NPRACH-Parameters-NB-r13
NPRACH-ParametersList-NB-v1330 ::=             SEQUENCE (SIZE (1.. maxNPRACH-Resources-NB-r13)) OF
                                                   NPRACH-Parameters-NB-v1330
NPRACH-Parameters-NB-r13::=                    SEQUENCE {
    nprach-Periodicity-r13                     ENUMERATED {ms40, ms80, ms160, ms240,
                                                   ms320, ms640, ms1280, ms2560},
    nprach-StartTime-r13                       ENUMERATED {ms8, ms16, ms32, ms64,
                                                   ms128, ms256, ms512, ms1024},
    nprach-SubcarrierOffset-r13                ENUMERATED {n0, n12, n24, n36, n2, n18, n34, spare1},
    nprach-NumSubcarriers-r13                  ENUMERATED {n12, n24, n36, n48},
    nprach-SubcarrierMSG3-RangeStart-r13       ENUMERATED {zero, oneThird, twoThird, one},
    maxNumPreambleAttemptCE-r13                ENUMERATED {n3, n4, n5, n6, n7, n8, n10, spare1},
    numRepetitionsPerPreambleAttempt-r13       ENUMERATED {n1, n2, n4, n8, n16, n32, n64, n128},
    npdcch-NumRepitions-RA-r13                     ENUMERATED {r1, r2, r4, r8, r16, r32, r64, r128,
                                                       r256, r512, r1024, r2048,
                                                       spare4, spare3, spare2, spare1},
    npdcch-StartSF-CSS-RA-r13                  ENUMERATED {v1dot5, v2, v4, v8, v16, v32, v48, v64},
    npdcch-Offset-RA-r13                       ENUMERATED {zero, oneEighth, oneFourth, threeEighth}
}
```

TABLE 6-continued

| | |
|---|---|
| NPRACH-Parameters-NB-v1330 ::= | SEQUENCE { |
|     nprach-NumCBBA-StartSubcarriers-r13 | ENUMERATED {n8, n10, n11, n12, n20, n22, n23, n24, n32, n34, n35, n36, n40, n44, n46, n48} |
| } | |
| RSRP-ThresholdNPRACH-InfoList-NB-r13 ::= | SEQUENCE (SIZE(1..2)) OF RSRP-Range |
| -- ASN1STOP | |

The following Table 7 is a table describing NPRACH-ConfigSIB-NB field.

TABLE 7

NPRACH-ConfigSIB-NB field descriptions maxNumPreambleAttemptCE
Maximum number of preamble transmission attempts per NPRACH resource. See TS 36.321 [6].
npdcch-NumRepetitions-RA
Maximum number of repetitions for NPDCCH common search space (CSS) for RAR, Msg3 retransmission and Msg4, see TS 36.213 [23, 16.6].
npdcch-Offset -RA
Fractional period offset of starting subframe for NPDCCH common search space (CSS Type 2), see TS 36.213 [23, 16.6].
npdcch-StartSF-CSS-RA
Starting subframe configuration for NPDCCH common search space (CSS), including RAR, Msg3 retransmission, and Msg4, see TS 36.213 [23, 16.6].
nprach-CP-Length
Cyclic prefix length for NPRACH transmission ($T_{CP}$), see TS 36.211 [21, 10.1.6]. Value us66dot7 corresponds to 66.7 microseconds and value us266dot7 corresponds to 266.7 microseconds.
nprach-NumCBRA-StartSubcarriers
The number of start subcarriers from which a UE can randomly select a start subcarrier as specified in TS 36.321 [6]. The start subcarrier indices that the UE is allowed to randomly select from, are given by
nprach-SubcarrierOffset + [0, nprach-NumCBRA-StartSubcarriers − 1]
nprach-NumSubcarriers
Number of sub-carriers in a NPRACH resource, see TS 36.211 [21, 10.1.6]. In number of subcarriers.
nprach-ParametersList
Configures NPRACH parameters for each NPRACH resource. Up to three PRACH resources can be configured in a cell. Each NPRACH resource is associated with a different number of NPRACH repetitions.
nprach-Periodicity
Periodicity of a NPRACH resource, see TS 36.211 [21, 10.1.6], Unit in millisecond.
nprach-StartTime
Start time of the NPRACH resource in one period, see TS 36.211 [21, 10.1.6]. Unit in millisecond.
nprach-SubcarrierOffset
Frequency location of the NPRACH resource, see TS 36.211 [21, 10.1.6]. In number of subcarriers, offset from sub-carrier 0.
nprach-SubcarrierMSG3-RangeStart
Fraction for calculating the starting subcarrier index of the range reserved for indication of UE support for multi-tone Msg3 transmission, within the NPRACH resource, see TS 36.211 [21, 10.1.6]. Multi-tone Msg3 transmission is not supported for {32, 64, 128} repetitions of NPRACH For at least one of the NPRACH resources with the number of NPRACH repetitions other than {32, 64, 128}, the value of nprach-SubcarrierMSG3-RangeStart should not be 0.
If nprach-SubcarrierMSG3-RangeStart is equal to oneThird}or twoThird the start subcarrier indexes for the two partitions are given by:
nprach-SubcarrierOffset + [0, floor(nprach-NumCBRA-StartSubcarriers * nprach-SubcarrierMSG3-RangeStart) −1]
for the single-tone Msg3 NPRACH partition;
nprach-SubcarrierOffset + [floor(nprach-NumCBRA-StartSubcarriers * nprach-SubcarrierMSG3-RangeStart), nprach-NumCBRA-StartSubcarriers − 1]
for the multi-tone Msg3 NPRACH partition;
numRepetitionsPerPreambleAttempt
Number of NPRACH repetitions per attempt for each NPRACH resource, See TS 36.211 [21, 10.1.6].
rsrp-ThresholdsPrachInfoList
The criterion for UEs to select a NPRACH resource. Up to 2 RSRP threshold values can be signalled. The first element corresponds to RSRP threshold 1, the second element corresponds to RSRP threshold 2. See TS 36.321 [6]. If absent, there is only one NPRACH resource.
A UE that supports powerClassNB-14dBm-r14 shall correct the RSRP threshold values before applying to them as follows:
RSRP threshold = Signalled RSRP threshold − min{0, (14−min(23, P-Max)) where P-Max is the value of p-Max field in SystemInformationBlockType1-NB.

As described above, narrowband (NB)-LTE refers to a system for supporting low power consumption and low complexity with a system bandwidth (BW) corresponding to 1 physical resource block (PRB) of the LTE system.

That is, the NB-LTE system may be primarily used as a communication scheme for implementing IoT by supporting a device (or UE), such as machine-type communication (MTC), in a cellular system. That is, the NB-LTE system may also be referred to as NB-IoT.

Further, the NB-LTE system does not need to allocate an additional band for the NB-LTE system by using OFDM parameters, such as a subcarrier spacing, used in the existing LTE system as it is. In this case, 1 PRB of the legacy LTE system band is allocated for the NB-LTE, which is advantageous in using the frequency efficiently.

The physical channel of the NB-LTE system may be defined as N-primary synchronization signal (N-PSS)/N-secondary synchronization signal (N-SSS), N-physical broadcast channel (N-PBCH), N-PDCCH/N-EPDCCH, N-PDSCH, etc., for the downlink. Here, 'N-' may be used for distinguishing from the legacy LTE.

In addition, there is M-PDCCH that is the control channel used in (e)MTC.

A concept using a repetition of PDCCH as in M-PDCCH/N-PDCCH operates as follows. The UE may be independently configured with a maximum repetition level (Rmax), a starting SF for search space (G), a starting SF offset ($\alpha$_offset), etc. for each search space from the base station.

More specifically, the parameter Rmax is a parameter representing the maximum number of repetitions for a search space of narrowband PDCCH (NPDCCH or MPDCCH). The parameter Rmax may be called maximum repetition level information.

The parameter G is a parameter representing a starting subframe configuration for search space. The parameter G may be called starting subframe information.

The $\alpha$_offset is a parameter representing a fractional period offset of a starting subframe for a narrowband PDCCH search space. The $\alpha$_offset may be called subframe offset information.

The UE can know which search space is set (which search space is configured) at any time (i.e., subframe level) through equations that are promised in a standard specification in advance.

The UE may determine whether to monitor the corresponding search space based on a specific rule.

The monitoring of the search space used in the present disclosure may be interpreted to represent or include an operation of the UE that receives PDCCH or decodes PDCCH in a search space.

The search space refers to a control channel space including at least one CCE and may be determined based on an aggregation level.

The Rmax, the G, and the previously promised equations that are used in the MTC and the NB-IoT are represented as the following Table 8, Equation 1, and Equation 2. The Equation 1 is used for the MTC, and the Equation 2 is used for the NB-IoT.

TABLE 8

| | MTC | | NB-IoT | |
|---|---|---|---|---|
| | G | | | G |
| Rmax | FDD | TDD | Rmax | FDD |
| 1 | 1 | 1 | 1 | 1.5 |
| 2 | 1.5 | 2 | 2 | 2 |
| 4 | 2 | 4 | 4 | 4 |
| 8 | 2.5 | 5 | 8 | 8 |
| 16 | 4 | 8 | 16 | 16 |
| 32 | 5 | 10 | 32 | 32 |
| 64 | 8 | 20 | 64 | 48 |
| 128 | 10 | — | 128 | 64 |
| 256 | — | — | 512 | — |
| — | — | — | 1024 | — |
| — | — | — | 2048 | — |

$$(10n_f + \lfloor n_s/2 \rfloor) \bmod T = \lfloor \alpha_{\textit{offset}} \cdot T \rfloor, \text{ where } T = R_{max} \cdot G \quad \text{[Equation 1]}$$

$$(10n_f + \lfloor n_s/2 \rfloor) \bmod T = \lfloor \alpha_{\textit{offset}} \cdot T \rfloor, \text{ where } T = R_{max} \cdot G, T \geq 4 \quad \text{[Equation 2]}$$

In this instance, $n_f$ is a system frame number and has a value between 0 and 1023.

$n_s$ is a slot index and has a value between 0 and 19.

G is given by higher layer parameter npdcch-StartSF-USS, and $\alpha_{\textit{offset}}$ is given by higher layer parameter npdcch-Offset-USS.

For NPDCCH Type2-NPDCCH common search space, G represented in Equation 2 is given by higher layer parameter npdcch-StartSF-CSS-RA, and $\alpha_{\textit{offset}}$ represented in Equation 2 is given by higher layer parameter npdcch-Offset-RA.

For NPDCCH Type2A-NPDCCH common search space, G represented in Equation 2 is given by higher layer parameter npdcch-StartSF-SC-MTCH, and $\alpha_{\textit{offset}}$ represented in Equation 2 is given by higher layer parameter npdcch-Offset-SC-MTCH.

In Equation 1 and Equation 2, a parameter T may be a parameter representing a starting period of a search space.

For Type1-NPDCCH common search space, k is k0 and is determined from a location of a NB-IoT paging opportunity subframe.

For Type1A-NPDCCH common search space, G represented in Equation 2 is given by higher layer parameter npdcch-StartSF-SC-MCCH, and $\alpha_{\textit{offset}}$ represented in Equation 2 is given by higher layer parameter npdcch-Offset-SC-MCCH.

If the UE is configured by high layers with a PRB for the monitoring of the NPDCCH UE-specific search space, the UE shall monitor the NPDCCH UE-specific search space on the higher layer configured PRB. In this case, the UE is not expected to receive NPSS, NSSS, and NPBCH on the corresponding PRB. On the other hand, if the PRB is not configured by the high layers, the UE shall monitor the NPDCCH UE-specific search space on the same PRB on which NPSS/NSSS/NPBCH are detected.

The UE may decide that configuration of a search space starts in a subframe (SF) satisfying the above Equation using T calculated by the product of Rmax and G and $\alpha_{\textit{offset}}$ etc. based on current timing (i.e., nf, ns).

If the UE has decided a starting SF of the search space, the corresponding search space becomes Rmax subframes from the starting SF based on DL valid SF.

If the starting SF is not a valid SF, a first DL valid SF that is subsequently present is a starting SF of the search space.

As represented in Table 8 above, a search space of the form illustrated above has been already used in TDD and FDD in Rel. 13 eMTC. A difference between the TDD and the FDD is that a maximum value of the G becomes twice (i.e., it becomes from 10 to 20), and only an integer remains. On the other hand, the Rmax value is maintained as it is.

FIG. 7 illustrates a method of configuring a search space in a FDD eMTC system.

If Rmax and G among parameters for a specific search space from a base station are configured to a maximum value, the UE may decide that a search space has been configured as illustrated in FIG. 7. In this instance, it is assumed that it is FDD, all the DL SFs are valid, and $\alpha_{\textit{offset}}$ is 0. A hatched portion 710 of FIG. 7 is an area which can be configured as a search space.

FIG. 8 illustrates a method of configuring a search space in a TDD eMTC system.

Additionally considering the TDD, it is as follows. Because the number of DL SFs is different per UL/DL configuration, UL/DL configuration #0 in which the number of DL SFs is two may be considered in consideration of the lowest density. Assuming that all the DL SFs are DL valid, the TDD scheme can obtain DL SF numbers possessed in the FDD scheme by collecting DL SFs existing over time that is five times more than the FDD scheme. This is represented as in FIG. 8. A hatched portion 810 of FIG. 8 is an area which can be configured as a search space.

That is, even when comparing FIGS. 7 and 8, because an interval between the search spaces is sufficiently separated, it is expected that there will not be a phenomenon in which the search spaces overlap each other unless there are unrealistically many invalid DL SFs.

FIG. 9 illustrates a method of configuring a search space in a NB-IoT system.

Next, NB-IoT FDD is illustrated as follows. If the parameter Rmax is configured to a maximum value and the parameter G is configured to 8 or more in parameters for a specific search space from a base station, the UE may decide that a search space has been configured as illustrated in FIG. 9. A hatched portion 910 of FIG. 9 is an area which can be configured as a search space. In this case, because a value of T is 16384 (=2048*8) or more that is greater than 10240, one search space is configured every 10240 SF.

Similar to the method that has been applied to the FDD and the TDD in the eMTC, even in the NB-IoT, even if the maximum value of G increases to two times or the G value increases, one search space is present every 10240 SF because the T value is greater than 10240 considering the large values of Rmax.

If it is assumed that UL/DL configuration #1 is used when a search space is configured with anchor carriers in a system in which the TDD NB-IoT returns to in/guard band mode, there is a problem that only one DL SF of ten SFs can be used because #0, #5, and #9 SFs should be always empty for NPSS, NSSS, and NPBCH. That is, when the Rmax is 2048, it passes 20480 SF, that are ten times the Rmax, and then only can secures 2048 DL valid SFs to thereby configure a search space. This cannot be made through Equation 2.

FIG. 10 illustrates a method of configuring a search space in a TDD NB-IoT system.

As another example, when a search space is configured with anchor carriers in a system in which the TDD NB-IoT returns to in/guard band mode, UL/DL configuration #6 can be used.

In this instance, if it is assumed that both two special SFs can be used as DL valid SFs, only two SFs of ten SFs can be used because #0, #5 and #9 SFs should be always empty for NPSS, NSSS, and NPBCH. That is, when the Rmax is 2048, it passes 10240 SF, that are five times the Rmax, and then only can secures 2048 DL valid SFs to thereby configure a search space.

This is represented as in FIG. 10. A hatched portion of FIG. 10 is an area which can be configured as a search space. That is, a search space is present every 10240 SF, and all the search spaces are adjoined together. When these search spaces are adjoined in the Rel.13 standard, (1) a UE supporting a single HARQ is configured not to monitor the entire of a second search space (i.e., the first search space in two consecutive search spaces that are not separated by 5 SF).

Further, (2) a UE supporting two HARQs is configured to monitor NPDCCH candidates (search space candidates) that are present earlier than 5SF from a starting SF of a third search space in several NPDCCH candidates (search space candidates) that may be present in the second search space.

In order to solve the above-described problem, the present disclosure proposes the following methods. Simply, the UE may expect that the base station does not configure the large values of Rmax generating the above-described problem. However, since this method is an operation that does not follow the basic design of the Rel. 13 NB-IoT, the present disclosure can consider the following methods for solving the problem while using the Rmax.

Accordingly, methods capable of validly using all the increasing values of T while using the large value of Rmax that has been defined in the standard are described below.

When following the currently defined standard, the T value increases as the Rmax value increases, but there is a problem that part of the increased T value has no significant meaning in Equation $((10n_f+\lfloor n_s/2 \rfloor) \mod T = \lfloor \alpha_{offset} \cdot T \rfloor)$, where $T=R_{max} \cdot G$) defined in the standard.

A reason why the T value needs to increase is to secure a large number of data reception areas (narrowband PDSCH) located next to the search space.

For the MTC/NB-IoT system, because the repetition occurs even in the data reception area, it may be desirable to secure as many data reception areas as possible.

When the T value increases, there may occur a problem that the delay increases. However, for the MTC/NB-IoT system, an increase in the T value does not greatly affect the corresponding system due to its characteristic that is not sensitive to the delay.

[Method 1] Method of Adding Hyper Frame Number to Equation for Determining Starting SF of Search Space Method 1 is a method of introducing a hyper frame number to determine a starting SF of a search space by changing Equation 2. In this instance, hyper frame number (HFN, $n_h$), system frame number (SFN, $n_f$), subframe number, and slot number ($n_s$) have a relationship and values represented in Table 9. Since 1024 system frames are present per one hyper frame, and a range of the HFN is 0 to 1023 (i.e., 1024 hyper frames), a max time of the HFN is 1024*1024=10485760.

TABLE 9

| Name | Range | Unit Time in ms | Max Time in ms | Max Time in sec |
|---|---|---|---|---|
| Slot number | 0~19 | 0.5 | 10 | 0.01 |
| Subframe number | 0~9 | 1 | 10 | 0.01 |
| SFN | 0~1023 | 10 | 10240 | 10.24 |
| HFN | 0~1023 | 1024 | 10485760 | 10485.76 (=2.91 hour) |

According to Equation 2, a maximum period of a space capable of configuring a search space is 10240 ms. A maximum period of a space capable of configuring a search space is 10485760 ms if it is configured as in Equation 3 by inserting the HFN. Thus, when Rmax is 2048, the T value obtained by Rmax*G is valid even if the G value has a value greater than 8.

$$(10240n_h+10n_f+\lfloor n_s/2 \rfloor) \mod T = \lfloor \alpha_{offset} * T \rfloor, \text{ where } T=R_{max} \cdot G, T \geq 4$$

Before and after change, the T value that is valid for the values of Rmax and G is as the following Table 10. In Table 10, because values represented in bold are greater than 10240 ms in the FDD, the values were not valid. However, if it is determined to use the equation including the HFN in the TDD as in Equation 3, a search space can be configured with the existing used G values more leisurely in time than before because the values represented in bold in Table 10 are valid values. Thus, if this method is used, the search space can be configured even if the large value of Rmax is used in anchor carriers. An advantage of this method is that it can solve the problem in the configuration of the search space by changing only Equation without changing the Rmax values and the G values that have been used in the FDD NB-IoT.

TABLE 10

| Rmax | G | | | | | | | |
|---|---|---|---|---|---|---|---|---|
| | 1.5 | 2 | 4 | 8 | 16 | 32 | 48 | 64 |
| 1 | 1.5 | 2 | 4 | 8 | 16 | 32 | 48 | 64 |
| 2 | 3 | 4 | 8 | 16 | 32 | 64 | 96 | 128 |
| 4 | 6 | 8 | 16 | 32 | 64 | 128 | 192 | 256 |
| 8 | 12 | 16 | 32 | 64 | 128 | 256 | 384 | 512 |
| 16 | 24 | 32 | 64 | 128 | 256 | 512 | 768 | 1024 |
| 32 | 48 | 64 | 128 | 256 | 512 | 1024 | 1536 | 2048 |
| 64 | 96 | 128 | 256 | 512 | 1024 | 2048 | 3072 | 4096 |
| 128 | 192 | 256 | 512 | 1024 | 2048 | 4096 | 6144 | 8192 |
| 256 | 384 | 512 | 1024 | 2048 | 4096 | 8192 | 12288 | 16384 |
| 512 | 768 | 1024 | 2048 | 4096 | 8192 | 16384 | 24576 | 32768 |
| 1024 | 1536 | 2048 | 4096 | 8192 | 16384 | 32768 | 49152 | 65536 |
| 2048 | 3072 | 4096 | 8192 | 16384 | 32768 | 65536 | 98304 | 131072 |

[Method 2] Method of Inserting HFN Related Additional Conditions While Reusing Existing Equation Method 2 is a method of adding conditions to Equation 2 while reusing Equation 2 used in the FDD NB-IoT. Typically, the Method 2 is a method in which the UE can determine whether or not it is a starting SF for the search space configuration according to which value a current HFN has using the values of Rmax, G, and $\alpha_{offset}$ and SFN, slot number, HFN, etc. for a specific search space configured from higher layers. Characteristically, if the HFN is even number (or odd number), it may be configured to be a starting SF for the search space configuration. Starting SF related equation for the search space configuration including additional conditions for using this method is the following Equation 4. If the conditions that the search space can be configured only when the HFN is the even number are added, a maximum period of T is 10240*2=20480.

$(10n_f+\lfloor n_s/2 \rfloor) \bmod T=\lfloor \alpha_{offset}*T \rfloor$, where $T=R_{max} \cdot G$,
$T \geq 4$ and i $n_h$ is even(or odd) [Equation 4]

Additionally, the HFN may be configured to be a starting SF for the search space configuration only in multiples of a specific value (e.g., K). Starting SF related equation for the search space configuration including additional conditions for using this method is the following Equation 5.

$(10n_f+\lfloor n_s/2 \rfloor) \bmod T=\lfloor \alpha_{offset}*T \rfloor$, where $T=R_{max} \cdot G$,
$T \geq 4$ and $n_h \bmod K=0$ [Equation 5]

If this method is used, a maximum period capable of configuring the search space is 10240*K. Preferably, the expression as a square number of 2 (i.e., $2^n$) is advantageous because it causes the number of spaces capable of being configured in the HFN to be divided by an integer.

The advantage of this method over the method using Equation 3 is that a maximum period capable of configuring the search space is flexible as much as 10240*K.

Characteristically, it is advantageous that this K value has been previously defined in the standard specification, but this method may allow the base station to configure the K value via higher layer signaling. The advantage of this method when it allows the base station to configure the K value is that the maximum period value can be changed according to the operation perspective of the base station. That is, from the standpoint of base station that is unlikely to frequently use such large values of Rmax (e.g., 2048, etc.), the base station may allow it to be the same equation as the legacy FDD by configuring the K value to 0.

Otherwise, the base station may be configured to increase the maximum period value capable of configuring the search space by configuring the K value to another value (e.g., K=4) not 0 and to smoothly operate even using the large values of Rmax.

[Method 3] Method of Reusing Existing Equation and Dropping Problem Portion in Search Space Configuration Method 3 is a method of using Equation 2 as it is and dropping a problem portion in the search space configuration without introducing an additional parameter such as HFN. More specifically, if a SF of a value equal to or greater than 10240 SF is necessary when calculating an area capable of being configured as the search space, (1) when NPDCCH candidate that hangs in 10240 SF or is greater than 10240 SF exists, it may be configured to discard all the NPDCCH candidates in the search space including the corresponding NPDCCH candidate (i.e., it is not required to monitor the corresponding search space candidates).

Here, discarding the NPDCCH candidates may mean dropping the NPDCCH candidates.

FIG. 11 illustrates a method of configuring a search space according to an embodiment of the present disclosure.

Referring to (a) of FIG. 11, (2) when NPDCCH candidate that hangs in 10240 SF or is greater than 10240 SF exists, it may be configured that among NPDCCH candidates in the search space including the corresponding NPDCCH candidate, only NPDCCH candidates before the NPDCCH candidate that hangs in 10240 SF or is greater than 10240 SF are valid.

That is, this can be interpreted as the same meaning as discarding or dropping only the hanging NPDCCH candidate.

Here, the hanging can be interpreted as the meaning that search spaces of the same type partially overlap each other.

It can be confirmed that the partially overlapping portion of search spaces of the same type is a search space of the same type that when a hatched portion 1(1110) and a hatched portion 2(1120) of FIG. 11(a) are interpreted through the overall description of the present disclosure.

That is, in FIG. 11, a search space corresponding to the reference number 1110 and a search space corresponding to the reference number 1120 are search spaces of the same type. As illustrated in FIG. 11(a), when an overlap occurs between search spaces of the same type, there is an effect of an increase in the efficiency of resource use by dropping only candidates 1130, going through the overlapping, among candidates of a previous search space.

In this instance, it may be configured to drop NPDCCH candidates including and subsequent to NPDCCH candidate that hangs in 10240 SF or is greater than 10240 SF (i.e., it is not required to monitor the corresponding NPDCCH candidates). If the above (1) method is used, the UE may be configured to previously promise not to use a combination of Rmax and G that causes the case of requiring SFs of an amount equal to or greater than 10240 SF for the search space, or configured to expect that the base station does not send the corresponding combination. The advantage of the (2) method over the (1) method is that it can use NPDCCH candidates that does not exceed 10240 SF while existing in the corresponding search space even if the entire search space requires SF of a value greater than 10240 SF. In addition, it may be configured to use the (1) method or the (2) method regardless of the number of supporting HARQ processes.

It may be configured that the (1) method and the (2) method can be applied for a UE supporting only single HARQ and a UE supporting up to two HARQs, respectively.

In addition, when the above-described (2) method is applied, this method may most simply monitor only NPDCCH candidates that is determined to need to be monitored, and may be finished. However, for the more efficient operation, a method of adaptively changing the interpretation method of Rmax in the corresponding search space may be considered. That is, it is assumed that Rmax value configured for the corresponding search space was $R_{max_{org}}$.

If the Rmax value obtained by changing the interpretation method is Rmax', it may be configured to be Rmax'=$R_{max_{org}}$*1/N using the smallest value of N while satisfying condition that an area in which NPDCCH candidate determined to need to be monitored through the (2) method is present is equal to or greater than 1/N of an area corresponding to the entire $R_{max_{org}}$.

In this instance, N is an integer greater than 1. Preferably, N may be expressed as a square number of 2 so that Rmax' has one value among the values of Rmax defined in the existing standard specification. FIG. 11 illustrates an example of the above-described method.

Because $R_{max_{org}}$=2048, and the space in which NPDCCH candidate (search space candidate) determined to need to be monitored through the (2) method is present is greater than ½ of the entire $R_{max_{org}}$, Rmax'=2048*1/2=1024 (see FIG. 11(a)) and it may be configured to monitor new NPDCCH candidates (see FIG. 11(b)). NPDCCH candidates indicated by X in FIG. 11(a) are NPDCCH candidates that are not required to be monitored.

FIG. 12 illustrates another example of a method of configuring a search space according to an embodiment of the present disclosure. Because $R_{max_{org}}$=2048, and a space in which NPDCCH candidate determined to need to be monitored through the (2) method is present is greater than ¼ of the entire $R_{max_{org}}$, Rmax'=2048*1/4=512 (see FIG. 12(a)) and it may be configured to monitor new NPDCCH candidates (see FIG. 12(b)). Candidates indicated by X in FIG. 12(a) are search space candidates that are not required to be monitored.

[Method 4] Method of Reusing Existing Equation and Introducing New Rmax Set without Using Rmax Generating Problem Method 4 may be configured to previously define in the standard specification not to use a combination of Rmax and G that causes the case of requiring SFs of an amount equal to or greater than 10240 SF for a specific search space, or configured for the UE to expect that the base station does not send the corresponding combination. In this instance, in order to solve a problem that the existing interval of Rmax is sparse, a method may be considered, which adds, to the specification, a new Rmax set, to which new values of Rmax are added, except the values of Rmax that are mentioned above and will not be used. That is, in the current FDD NB-IoT, as represented in Table 8, 12 values are present between 1 and 2048. If it is determined not to use 1024 and 2048 that are predicted as a value that may cause the above-mentioned problem, a new Rmax set can be made by adding new two values. It may be preferable that the added values of Rmax are configured to multiples of 8 and are used without much modifying the current spec. For example, 192 (=128+64) and 384 (=128+256) may be considered as the new Rmax value. As a result, the new Rmax set is {1, 2, 4, 8, 16, 32, 64, 128, 192, 256, 384, 512}, and the corresponding new Rmax set can be immediately used in the UE-specific search space (USS) or the Type 2/2A common search space (CSS) without the modification of the spec.

In the Type 1/1A CSS, when the value of Rmax is 192 and 384 except that the value of Rmax is 1024 and 2048, values of R may be configured as in Table 11.

TABLE 11

| $R_{max}$ | R | | | | | | | | NCCE indices of monitored NPDCCH candidates | |
|---|---|---|---|---|---|---|---|---|---|---|
| | | | | | | | | | L' = 1 | L' = 2 |
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| 128 | 1 | 2 | 4 | 8 | 16 | 32 | 64 | 128 | — | {0, 1} |
| 192 | 1 | 3 | 6 | 12 | 24 | 48 | 96 | 192 | — | {0, 1} |
| 256 | 1 | 4 | 8 | 16 | 32 | 64 | 128 | 256 | — | {0, 1} |
| 384 | 1 | 6 | 12 | 24 | 48 | 96 | 192 | 384 | — | {0, 1} |
| 512 | 1 | 8 | 16 | 32 | 64 | 128 | 256 | 512 | — | {0, 1} |
| DCI subframe repetition number | 000 | 001 | 010 | 011 | 100 | 101 | 110 | 111 | | |

Note 1:
{x, y} denotes NPDCCH format 1 candidate corresponding to NCCEs 'x' and 'y'.

In addition, it is possible to maintain an existing tone in which when Rmax is 512 and a DCI subframe repetition number field value is 001, the R value increases or equals for the same DCI subframe repetition number field value by modifying the R value to 8 as the Rmax value increases.

In addition, the TDD NB-IoT may be configured to count parameters for a period for the search space configuration based on DL subframe.

That is, a method may be considered, which counts, based on the DL subframe, a value of parameter such as T which is required when actually configuring the search space while using as it is the existing used Equation and parameters such as Rmax and G.

More specifically, if T is counted to 2560 based on the values configured via higher layers, it may be configured that a duration, that 2560 DL SFs have, is determined as a period of the search space in the TDD if a period of the search space has been determined to be 2560 ms in the FDD.

Characteristically, only when a special subframe corresponds to special subframe configuration in which enough DwPTS symbols to be able to substantially transmit the NPDCCH are secured, it may be configured that the corresponding special subframe is regarded as the DL subframe and counted.

Characteristically, the number of enough DwPTS symbols to be able to transmit the NPDCCH may be six.

In addition, even if the enough DwPTS symbols to be able to transmit the NPDCCH is guaranteed to the sufficient number, it may seem that the corresponding special subframe is not regarded as the DL subframe if it cannot be expected that a narrow band reference signal (NRS) is always transmitted (e.g., CRS-less special subframe configuration #10).

That is, in general, the special subframe in which the NPDCCH can be transmitted may refer to a special subframe in which it can be expected that NRS is always transmitted, and/or a special subframe in which the number of DwPTS symbols is equal to or greater than a specific value (e.g., 6).

In this instance, the T value actually obtained through the parameter was 2560, but an actual period of the search space may be configured to be greater than the T value.

If $T_{TDD}$ denotes a period value of a new search space to be applied in the TDD (in units of ms), and $SF_{TDD}^{DL}$ denotes the number of DL subframes and special subframes, that may be regarded as the DL subframe, in a single radio frame, this may be represented by the following Equation: $T_{TDD} = \lceil T*(10/SF_{TDD}^{DL}) \rceil$.

More specifically, for example, if an UL/DL configuration index is #2 (i.e., DSUDD DSUDD), and a special subframe configuration index is #4 (i.e., DwPTS is 12 symbols), the number of DL subframes and special subframes, that may be regarded as the DL subframe, in the single radio frame is 8.

In such a case, if the T value obtained by using as it is the parameter values such as Rmax and G in the existing method was 2560 (ms), the following may be applied: $T_{TDD} = 2560*10/8 = 3200$ (ms).

Because the search spaces can be present at a sufficient distance if this method is used, the problem that the search spaces are frequently dropped can be reduced. In addition, the counting based on DL valid SF may be considered instead of counting based on DL SF.

FIG. 13 is a flow chart illustrating a method for a UE to receive a narrowband PDCCH (NPDCCH) in a wireless communication system according to an embodiment of the present disclosure.

Referring to FIG. 13, a UE receives search space related information from a base station via higher layer signaling in S1301.

The search space related information may include Rmax, G, α_offset, a parameter calculated through this, or other information required for search space configuration.

Next, the UE receives, from the base station, a narrowband PDCCH in a search space including one or more narrowband PDCCH candidates in S1302.

The search space may include a first search space defined based on the search space related information and a second search space with the same type as the first search space.

When the first search space and the second search space partially overlap each other, the UE drops at least one narrowband PDCCH candidate of the first search space that overlaps the second search space.

The dropping of the at least one NPDCCH candidate may be defined or configured only when the UE operates in a time division duplex (TDD) system.

The first search space and the second search space may be a narrowband PDCCH UE-specific search space or a narrowband PDCCH common search space.

The common search space may be a Type 1-NPDCCH common search space, a Type 1A-NPDCCH common search space, a Type 2-NPDCCH common search space, or a Type 2A-NPDCCH common search space.

The dropping used in the present disclosure may mean that the base station or the UE does not transmit or receive a signal and performs a puncturing or rate matching operation.

Since the method illustrated in FIG. 13 is the same as the operation method of the UE described with reference to FIGS. 1 to 12, other detailed description is omitted.

FIG. 14 is a flow chart illustrating a method for a base station to transmit a narrowband PDCCH (NPDCCH) in a wireless communication system according to an embodiment of the present disclosure.

First, a base station transmits search space related information to a UE via higher layer signaling in S1401.

Next, the base station transmits, to the UE, a narrowband PDCCH in a search space including one or more narrowband PDCCH candidates in S1402.

The search space may include a first search space defined based on the search space related information and a second search space with the same type as the first search space.

When the first search space and the second search space partially overlap each other, the base station may drop at least one NPDCCH candidate of the first search space that overlaps the second search space and inform the UE of the dropped at least one narrowband PDCCH candidate.

The dropping of the at least one NPDCCH candidate may be performed only in a time division duplex (TDD) system.

The first search space and the second search space may be a narrowband PDCCH UE-specific search space or a narrowband PDCCH common search space.

The common search space may be a Type 1-NPDCCH common search space, a Type 1A-NPDCCH common search space, a Type 2-NPDCCH common search space, or a Type 2A-NPDCCH common search space.

Overview of Device to which the Present Disclosure is Applicable

FIG. 15 illustrates a block configuration diagram of a wireless communication device to which methods described in the present disclosure are applicable.

Referring to FIG. 15, a wireless communication system includes a base station 1510 and multiple UEs 1520 located in an area of the base station.

The base station 1510 includes a processor 1511, a memory 1512, and a radio frequency (RF) unit 1513. The processor 1511 implements functions, processes, and/or methods described in FIGS. 1 to 14. Layers of radio interface protocol may be implemented by the processor 1511. The memory 1512 is connected to the processor 1511 and stores various types of information for driving the processor 1511. The RF unit 1513 is connected to the processor 1511 and transmits and/or receives a radio signal.

The UE 1520 includes a processor 1521, a memory 1522, and a RF unit 1523.

The processor 1521 implements functions, processes, and/or methods described in FIGS. 1 to 14. Layers of radio interface protocol may be implemented by the processor 1521. The memory 1522 is connected to the processor 1521 and stores various types of information for driving the processor 1521. The RF unit 1523 is connected to the processor 1521 and transmits and/or receives radio signals.

The memories 1512 and 1522 may be inside or outside the processors 1511 and 1521 and may be connected to the processors 1511 and 1521 through various well-known means. Further, the base station 1510 and/or the UE 1520 may have a single antenna or multiple antennas.

FIG. 16 illustrates a block configuration diagram of a communication device according to an embodiment of the present disclosure.

In particular, FIG. 16 illustrates in more detail the UE illustrated in FIG. 15.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods described in FIGS. 1 to 14. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives a RF signal. The processor 1610 transfers instructional information to the RF module 1635 in order to initiate communication, for example, transmit a radio signal configuring voice communication data. The RF module 1635 consists of a receiver and a transmitter to receive and transmit the radio signal. The antenna 1640 functions to transmit and receive the radio signal. Upon reception of the radio signal, the RF module 1635 may send a signal to be processed by the processor 1610 and convert the signal into a baseband. The processed signal may be converted into audible or readable information output via the speaker 1645.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving data in a wireless communication system supporting NB-IoT according to the present disclosure has been described focusing on examples applying to the 3GPP LTE/LTE-A system, it can be applied to various wireless communication systems other than the 3GPP LTE/LTE-A system.

The invention claimed is:

1. A method of receiving, by a user equipment (UE), a narrowband physical downlink control channel (PDCCH) in a wireless communication system supporting a narrowband, the method comprising:
receiving, from a base station, search space related information via a higher layer signaling, wherein the search space related information includes a first parameter related to maximum repetition level and a second parameter related to a starting subframe; and receiving, from the base station, the narrowband PDCCH (NPDCCH) in a search space including one or more narrowband PDCCH candidates, wherein the search space includes a first search space defined based on the search space related information and a second search space with the same type as the first search space, wherein based on the first search space and the second search space partially overlapping each other, at least one narrowband PDCCH candidate of the first search space that overlaps the second search space is dropped, wherein periodicity for the search space is determined based on (first parameter x second parameter), and wherein the periodicity for the search space is counted based on a downlink subframe and a special subframe including 6 downlink pilot time slot (DwPTS) symbols.

2. The method of claim 1, wherein the search space related information includes maximum repetition level information, starting subframe information, or subframe offset information.

3. The method of claim 1, wherein the UE operates in a time division duplex (TDD) system.

4. The method of claim 1, wherein the first search space and the second search space are a narrowband PDCCH UE-specific search space or a narrowband PDCCH common search space.

5. The method of claim 4, wherein the common search space is a Type 1-NPDCCH common search space, a Type 1A-NPDCCH common search space, a Type 2-NPDCCH common search space, or a Type 2A-NPDCCH common search space.

6. A user equipment (UE) configuring to receive a narrowband physical downlink control channel (PDCCH) in a wireless communication system supporting a narrowband, the UE comprising:

a transceiver;
at least one processor; and
at least one memory operably connectable to the at least one processor and storing instructions that, based on being executed by the at least one processor, perform operations comprising:

receiving, from a base station, search space related information via a higher layer signaling, wherein the search space related information includes a first parameter related to maximum repetition level and a second parameter related to a starting subframe; and receiving, from the base station, the narrowband PDCCH (NPDCCH) in a search space including one or more narrowband PDCCH candidates, wherein the search space includes a first search space defined based on the search space related information and a second search space with the same type as the first search space, wherein based on the first search space and the second search space partially overlapping each other, at least one narrowband PDCCH candidate of the first search space that overlaps the second search space is dropped, wherein periodicity for the search space is determined based on (first parameter x second parameter), and wherein the periodicity for the search space is counted based on a downlink subframe and a special subframe including 6 downlink pilot time slot (DwPTS) symbols.

7. The UE of claim 6, wherein the search space related information includes maximum repetition level information, starting subframe information, or subframe offset information.

8. The UE of claim 6, wherein the UE operates in a time division duplex (TDD) system.

9. The UE of claim 6, wherein the first search space and the second search space are a narrowband PDCCH UE-specific search space or a narrowband PDCCH common search space.

10. The UE of claim 9, wherein the common search space is a Type 1-NPDCCH common search space, a Type 1A-NPDCCH common search space, a Type 2-NPDCCH common search space, or a Type 2A-NPDCCH common search space.

* * * * *